(12) United States Patent
Jung et al.

(10) Patent No.: US 11,973,986 B2
(45) Date of Patent: *Apr. 30, 2024

(54) VIDEO SIGNAL PROCESSING METHOD AND DEVICE USING SECONDARY TRANSFORM

(71) Applicant: HUMAX CO., LTD., Yongin-si (KR)

(72) Inventors: Jaehong Jung, Seoul (KR); Dongcheol Kim, Suwon-Si (KR); Juhyung Son, Uiwang-Si (KR); Geonjung Ko, Seoul (KR); Jinsam Kwak, Uiwang-si (KR)

(73) Assignee: HUMAX CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,460

(22) Filed: Feb. 3, 2023

(65) Prior Publication Data

US 2023/0188754 A1   Jun. 15, 2023

Related U.S. Application Data

(63) Continuation of application No. 17/348,227, filed on Jun. 15, 2021, now Pat. No. 11,616,984, which is a
(Continued)

(30) Foreign Application Priority Data

Feb. 8, 2019   (KR) .................. 10-2019-0014736
Mar. 27, 2019   (KR) .................. 10-2019-0035438
Apr. 30, 2019   (KR) .................. 10-2019-0051052

(51) Int. Cl.
H04N 19/119   (2014.01)
H04N 19/159   (2014.01)
(Continued)

(52) U.S. Cl.
CPC ......... H04N 19/619 (2014.11); H04N 19/119 (2014.11); H04N 19/159 (2014.11); H04N 19/176 (2014.11); H04N 19/70 (2014.11)

(58) Field of Classification Search
CPC .......................... H04N 19/619; H04N 19/119
See application file for complete search history.

(56) References Cited

U.S. PATENT DOCUMENTS

2017/0019686 A1   1/2017 Chiu et al.
2018/0176587 A1   6/2018 Panusopone et al.
(Continued)

FOREIGN PATENT DOCUMENTS

CN   108712650 A   10/2018
JP   2022504552 A   1/2022
(Continued)

OTHER PUBLICATIONS

Li, Ling et al.,Non-CE3: block size restriction on PDPC,Joint Video Experts Team (JVET) of ITU-T SG 16 WP 3 and ISO/IEC JTC 1/SC 29/WG 1113th Meeting: Marrakech, MA, Jan. 9-18, 2019, [JVET-M0814-v5],JVET-M0814 (version 7),ITU-T,Jan. 16, 2019,<URL:http://phenix.it-sudparis.eu/jvet/doc_end_user/documents/13_Marrakech/wg11/JVET-M0814-v7.zip>: JVET-M0814-v7.docx.
(Continued)

*Primary Examiner* — Jerry T Jean Baptiste

(57) ABSTRACT

A video signal processing device includes a processor. The processor is configured to obtain a secondary transform kernel for a current block based on an intra prediction mode of the current block to which a secondary transform is applied, to obtain a secondary inverse transformed block by performing a secondary inverse transform on a top-left specific region of the current block using the secondary transform kernel, wherein the secondary inverse transform is an inverse transform of the secondary transform, and the
(Continued)

secondary transform is a low frequency non-separable transform, to obtain a residual block of the current block by performing a primary inverse transform on the secondary inverse transformed block, wherein one or more coefficients of the top-left specific region of the current block are derived in a preset scan order and the preset scan order is a 4×4 up-right diagonal scan order regardless of a size of the current block.

20 Claims, 16 Drawing Sheets

Related U.S. Application Data continuation of application No. PCT/KR2020/001853, filed on Feb. 10, 2020.

(51) Int. Cl.
  *H04N 19/176* (2014.01)
  *H04N 19/61* (2014.01)
  *H04N 19/70* (2014.01)

(56) References Cited

U.S. PATENT DOCUMENTS

| | | |
|---|---|---|
| 2018/0249179 A1 | 8/2018 | Han et al. |
| 2018/0302631 A1 | 10/2018 | Chiang et al. |
| 2018/0332284 A1 | 11/2018 | Liu et al. |
| 2019/0313102 A1* | 10/2019 | Cho ............... H04N 19/132 |
| 2021/0360240 A1 | 11/2021 | Lee |
| 2022/0132109 A1 | 4/2022 | Choi et al. |
| 2022/0191546 A1* | 6/2022 | Koo ............... H04N 19/46 |

FOREIGN PATENT DOCUMENTS

| | | |
|---|---|---|
| KR | 1020100095992 A | 9/2010 |
| KR | 1020170117112 A | 10/2017 |
| KR | 20180040126 A | 4/2018 |
| KR | 20180063201 A | 6/2018 |
| KR | 20180122362 A | 11/2018 |
| KR | 10-2019-0010245 A | 1/2019 |
| WO | 2016129980 A1 | 8/2016 |
| WO | 2018038554 A1 | 3/2018 |
| WO | 2019235797 A1 | 12/2019 |
| WO | 2020159316 A1 | 8/2020 |
| WO | 2020260313 A1 | 12/2020 |

OTHER PUBLICATIONS

Chen, Jianle et al.,Algorithm Description of Joint Exploration Test Model 7 (JEM 7),Joint Video Exploration Team (JVET) of ITU-T SG 16 WP 3 and ISO/IEC JTC 1/SC 29/WG 11 7th Meeting: Torino, IT, Jul. 13-21, 2017 , [JVET-G1001-v1],JVET-G1001 (version 1),ITU-T,Aug. 19, 2017,<URL: http://phenix.it-sudparis.eu/jvet/doc_end_user/documents/7_Torino/wg11/JVET-G1001-v1.zip>: JVET-G1001-v1.docx.
Non-Final Rejection of U.S. Appl. No. 17/348,227 from the USPTO dated Jun. 27, 2022.
Notice of Allowance of U.S. Appl. No. 17/348,227 from the USPTO dated Nov. 2, 2022.
Corrected Notice of Allowability of U.S. Appl. No. 17/348,227 from the USPTO dated Feb. 1, 2023.
Priority documents(U.S. Appl. No. 62/834,487) of PCT International Application PCT/CN2020/084895, dated Apr. 23, 2020.
International Search Report of PCT/KR2020/002920, dated Jun. 16, 2020.
Written Opinion of the International Search Authority for PCT/KR2020/002920, dated Jun. 16, 2020.
"Examination report under sections 12 & 13 of the Patents Act, 1970 and the Patents Rules, 2003" from Intellectual Property India for Application No. 202127037310, dated Mar. 25, 2022.
"CE3: Intra Sub-Partitions Coding Mode (Tests 1.1.1 and 1.1.2)". Document: JVET-M0102-v54 Joint Video Experts Team (JVET) of ITU-T SG 16 WP 3 and ISO/IEC JTC 1/SC 29/WG 11 13th Meeting: Marrakech, MA, Jan. 9-18, 2019.
"Versatile Video Coding (Draft 3)" Document: JVET-L1001-v9 Joint Video Experts Team (JVET) of ITU-T SG 16 WP 3 and ISO/IEC JTC 1/SC 29/WG 11 12th Meeting: Macao, CN, Oct. 3-12, 2018.
JVET-M0102-CE3-1.1.1.xlsm Reference:VTM-3.0 Tested:CE3-Test 1.1.1 Note: BD-rate is computed using piece-wise cubic interpolation.
JVET-M0102-CE3-1.1.1+nonDCT2SizeRestr.xlsm Reference:VTM-3.0 Tested:Test CE3-1.1.1 with a non-DCT-II transform size restriction Note: BD-rate is computed using piece-wise cubic interpolation.
JVET-M0102-CE3-1.1.1+nonDCT2SizeRestr+ReversedModesDisabled.xlsm Reference:VTM-3.0 Tested:Additional Test CE3-1.1.1 with non-DCT-II restriction and reversed modes disabled Note: BD-rate is computed using piece-wise cubic interpolation.
JVET-M0102-CE3-1.1.2.xlsm Reference:VTM-3.0 Tested:Test CE3-1.1.2 Note: BD-rate is computed using piece-wise cubic interpolation.
JVET-M0102-CE3-1.1.2+Vertical4xN.xlsm Reference:anchor Tested:test2Vertical4xn Note: BD-rate is computed using piece-wise cubic interpolation.
Spec_text_CE6-5_1.
Reduced Secondary Transform (RST) _PPTAlgorithm Description(JVET-M0292) Moonmo Koo, Mehdi Salehifar, Jaehyun Kim, and Seung Hwan Kim.
"CE6: Reduced Secondary Transform (RST) (test 6.5.1)" Document: JVET-M0292_r5 Joint Video Experts Team (JVET) of ITU-T SG 16 WP 3 and ISO/IEC JTC 1/SC 29/WG 11 13th Meeting: Marrakech, MA, Jan. 9-18, 2019.
"CE6: Reduced Secondary Transform (RST) (test 6.5.1)" Document: JVET-M0292_r4 Joint Video Experts Team (JVET) of ITU-T SG 16 WP 3 and ISO/IEC JTC 1/SC 29/WG 11 13th Meeting: Marrakech, MA, Jan. 9-18, 2019.
"CE6: Reduced Secondary Transform (RST) (test 6.5.1)" Document: JVET-M0292_r3 Joint Video Experts Team (JVET) of ITU-T SG 16 WP 3 and ISO/IEC JTC 1/SC 29/WG 11 13th Meeting: Marrakech, MA, Jan. 9-18, 2019.
"CE 6-5.1: Reduced Secondary Transform (RST) (test 6.5.1)" Document: JVET-M0292_r2 Joint Video Experts Team (JVET) of ITU-T SG 16 WP 3 and ISO/IEC JTC 1/SC 29/WG 11 13th Meeting: Marrakech, MA, Jan. 9-18, 2019.
"CE 6-5.1: Reduced Secondary Transform (RST) (test 6.5.1)" Document: JVET-M0292_r1 Joint Video Experts Team (JVET) of ITU-T SG 16 WP 3 and ISO/IEC JTC 1/SC 29/WG 11 13th Meeting: Marrakech, MA, Jan. 9-18, 2019.
CE6_5_1_Test1_CTC.XLSM Reference:VTM-3.0 Tested:Test Note: BD-rate is computed using piece-wise cubic interpolation.
CE6_5_1_Test1_interMTSOn.XLSM Reference:VTM-3.0 Tested:Test Note: BD-rate is computed using piece-wise cubic interpolation.
CE6_5_1_Test2_CTC.XLSM Reference:VTM-3.0 Tested:Test Note: BD-rate is computed using piece-wise cubic interpolation.
CE6_5_1_Test2_interMTSOn.XLSM Reference:VTM-3.0 Tested:Test Note: BD-rate is computed using piece-wise cubic interpolation.
CE6_5_1_Test3_CTC.XLSM Reference:VTM-3.0 Tested:Test Note: BD-rate is computed using piece-wise cubic interpolation.
CE6_5_1_Test3_interMTSOn.XLSM Reference:VTM-3.0 Tested:Test Note: BD-rate is computed using piece-wise cubic interpolation.
CE6_5_1_Test4_CTC.XLSM Reference:VTM-3.0 Tested:Test Note: BD-rate is computed using piece-wise cubic interpolation.
"CE6: Reduced Secondary Transform (RST) (CE6-3.1)" Document: JVET-N0193_r1 Joint Video Experts Team (JVET) of ITU-T SG 16 WP 3 and ISO/IEC JTC 1/SC 29/WG 11 14th Meeting: Geneva, CH, Mar. 19-27, 2019.

(56) References Cited

OTHER PUBLICATIONS

"CE6: Reduced Secondary Transform (RST) (CE6-3.1)" Document: JVET-N0193_r2 Joint Video Experts Team (JVET) of ITU-T SG 16 WP 3 and ISO/IEC JTC 1/SC 29/WG 11 14th Meeting: Geneva, CH, Mar. 19-27, 2019.
"CE6: Reduced Secondary Transform (RST) (CE6-3.1)" Document: JVET-N0193_r3 Joint Video Experts Team (JVET) of ITU-T SG 16 WP 3 and ISO/IEC JTC 1/SC 29/WG 11 14th Meeting: Geneva, CH, Mar. 19-27, 2019.
Reduced Secondary Transform (RST) _PPTAlgorithm Description(JVET-N0193) Moonmo Koo, Mehdi Salehifar, Jaehyun Kim, and Seung Hwan Kim.
Spec_text_CE6-3_1.
Spec_text_CE6-3_1d.
CE6_3_1a_CTC.XLSM Reference:VTM-4.0 Tested:Test Note: BD-rate is computed using piece-wise cubic interpolation.
CE6_3_1a_interMTSOn.XLSM Reference:VTM-4.0 Tested:Test Note: BD-rate is computed using piece-wise cubic interpolation.
CE6_3_1a_lowQP.XLSM Reference:VTM-4.0 Tested:Test Note: BD-rate is computed using piece-wise cubic interpolation.
CE6_3_1b_CTC.XLSM Reference:VTM-4.0 Tested:Test Note: BD-rate is computed using piece-wise cubic interpolation.
CE6_3_1b_interMTSOn.XLSM Reference:VTM-4.0 Tested:Test Note: BD-rate is computed using piece-wise cubic interpolation.
CE6_3_1b_lowQP.XLSM Reference:VTM-4.0 Tested:Test Note: BD-rate is computed using piece-wise cubic interpolation.
CE6_3_1c_CTC.XLSM Reference:VTM-4.0 Tested:Test Note: BD-rate is computed using piece-wise cubic interpolation.
CE6_3_1c_interMTSOn.XLSM Reference:VTM-4.0 Tested:Test Note: BD-rate is computed using piece-wise cubic interpolation.
CE6_3_1c_lowQP.XLSM Reference:VTM-4.0 Tested:Test Note: BD-rate is computed using piece-wise cubic interpolation.
CE6_3_1d_CTC.XLSM Reference: VTM-4.0 Tested: Test Note: BD-rate is computed using piece-wise cubic interpolation.
CE6_3_1d_interMTSOn.XLSM Reference:VTM-4.0 Tested:Test Note: BD-rate is computed using piece-wise cubic interpolation.
CE6_3_1d_lowQP.XLSM Reference:VTM-4.0 Tested:Test Note: BD-rate is computed using piece-wise cubic interpolation.
CE6_3_1e_CTC.XLSM Reference:VTM-4.0 Tested:Test Note: BD-rate is computed using piece-wise cubic interpolation.
CE6_3_1e_interMTSOn.XLSM Reference:VTM-4.0 Tested:Test Note: BD-rate is computed using piece-wise cubic interpolation.
CE6_3_1e_lowQP.XLSM Reference:VTM-4.0 Tested:Test Note: BD-rate is computed using piece-wise cubic interpolation.
International Search Report of International application No. PCT/KR2020/001853, dated May 20, 2020.
Written Opinion of International application No. PCT/KR2020/001853, dated May 20, 2020.
Notice of Reasons for Refusal for Japanese Patent Application No. 2021-550241 from JPO, dated Oct. 11, 2022.
De-Luxan-Hernandez, Santiago et al.,CE3: Intra Sub-Partitions Coding Mode (Tests 1.1.1 and 1.1.2),Joint Video Experts Team (JVET) of ITU-TSG 16 WP 3 and ISO/IEC JTC 1/SC 29/WG 11 13th Meeting: Marrakech, MA, Jan. 9-18, 2019, [JVET-M0102-v2],JVET-M0102 (version 2),ITU-T,Jan. 2, 2019,<URL:http://phenix.it-sudparis.eu/jvet/doc_end_user/documents/13_Marrakech/wg11/JVET-M0102-v2.zip>: JVET-M0102_v1.docx.
Office Action from United States Patent and Trademark Office dated Aug. 31, 2023; U.S. Appl. No. 17/401,923; Inventor: Dongcheol Kim; Title: Video Signal Processing Method and Device Using Secondary Transform.
Notification of First Office Action for Application No. 202080016690.3 from China National Intellectual Property Administration dated Dec. 6, 2023 including Search Report of China National Intellectual Property.
Hearing Notice in Reference of Application No. 202127037310 from Patent Office, Intellectual Property India, dated Dec. 19, 2023.
Notice of Allowance of U.S. Appl. No. 17/401,923 from the USPTO on Jan. 8, 2024.

\* cited by examiner

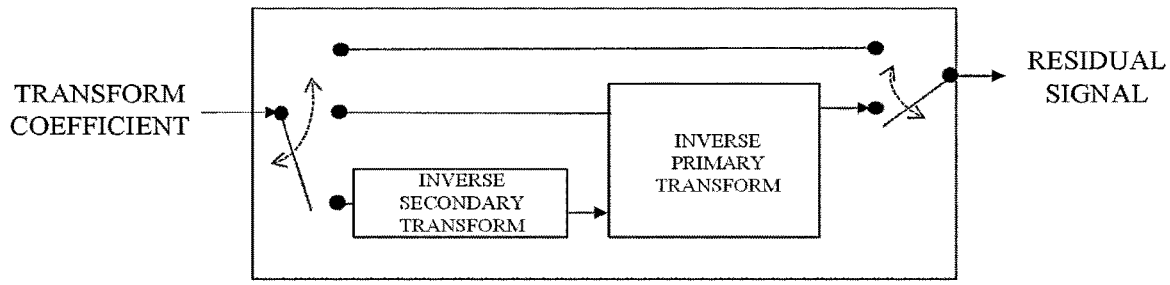

FIG. 8

| Transform Type | Basis function $T_i(j)$, $i,j=0, 1,\ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br><br>where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right),$<br><br>where $\omega_0 = \begin{cases} \sqrt{\dfrac{2}{N}} & i = 0 \\ 1 & i \neq 0 \end{cases}, \omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 | |
|---|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 | | | | |
|---|---|---|---|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

(a)

| Transform Type | Basis function $T_i(j)$, $i, j=0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br><br>where $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

(b)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

(c)

| Transform set | Transform Candidates |
|---|---|
| 0 | DST-VII, DCT-VIII |
| 1 | DST-VII, DCT-VIII |
| 2 | DST-VII, DCT-VIII |

(d)

| Transform set | Transform Candidates |
|---|---|
| 0 | DST-VII, DCT-VIII |

*FIG. 12*

```
i = 0
x = 0
y = 0
stopLoop = FALSE
while( !stopLoop ) {
  while( y >= 0 ) {
    if( x < blkWidth && y < blkHeight ) {
      diagScan[ i ][ 0 ] = x
      diagScan[ i ][ 1 ] = y
      i++
    }
    y- -
    x++
  }
  y = x
  x = 0
  if( i >= blkWidth * blkHeight )
    stopLoop = TRUE
```

*FIG. 17*

DiagScanOrder[2][2]

| y \ x | 0 | 1 | 2 | 3 |
|---|---|---|---|---|
| 0 | 0 | 2 | 5 | 9 |
| 1 | 1 | 4 | 8 | 12 |
| 2 | 3 | 7 | 11 | 14 |
| 3 | 6 | 10 | 13 | 15 |

DiagScanOrder[3][3]

| y \ x | 0 | 1 | 2 | 3 | 4 | 5 | 6 | 7 |
|---|---|---|---|---|---|---|---|---|
| 0 | 0 | 2 | 5 | 9 | 14 | 20 | 27 | 35 |
| 1 | 1 | 4 | 8 | 13 | 19 | 26 | 34 | 42 |
| 2 | 3 | 7 | 12 | 18 | 25 | 33 | 41 | 48 |
| 3 | 6 | 11 | 17 | 24 | 32 | 40 | 47 | 53 |
| 4 | 10 | 16 | 23 | 31 | 39 | 46 | 52 | 57 |
| 5 | 15 | 22 | 30 | 38 | 45 | 51 | 56 | 60 |
| 6 | 21 | 29 | 37 | 44 | 50 | 55 | 59 | 62 |
| 7 | 28 | 36 | 43 | 49 | 54 | 58 | 61 | 63 |

*FIG. 18*

Secondary transformation process

Inputs to this process are:

- a variable nTrS specifying the transform output length,
- a variable nonZeroSize specifying the transform input length,
- a list of transform input x[ j ] with j = 0..nonZeroSize − 1,
- a variable stPredModeIntra specifying the index for transform set selection,
- a variable stIdx specifying the index for transform selection in a set.

Output of this process is the list of transformed samples y[ i ] with i = 0..nTrS − 1.

The transformation matrix derivation process is involved with the transform output length nTrS, the index for transform set selection stPredModeIntra, and the index for transform selection in a transform set stIdx as inputs, and the transformation matrix secTransMatrix as output.

The list of transformed samples y[ i ] with i = 0..nTrS − 1 is derived as follows:

y[i] = Clip3( CoeffMin, CoeffMax, $\sum_{j=0}^{nonZeroSize-1}$ secTransMatrix[i][j] ∗ x[j] )  with i = 0..nTrS − 1

*FIG. 19*

Secondary Transformation matrix derivation process

Inputs to this process are:
- a variable nTrS specifying the transform output length,
- a variable stPredModeIntra specifying the index for transform set selection,
- a variable stIdx specifying the index for transform selection in the designated transform set.

Output of this process is the transformation matrix secTransMatrix.

The variable stTrSetIdx is derived as follows:

| stPredModeIntra | stTrSetIdx |
|---|---|
| stPredModeIntra < 0 | 1 |
| 0 <= stPredModeIntra <= 1 | 0 |
| 2 <= stPredModeIntra <= 12 | 1 |
| 13 <= stPredModeIntra <= 23 | 2 |
| 24 <= stPredModeIntra <= 44 | 3 |
| 45 <= stPredModeIntra <= 55 | 2 |
| 56 <= stPredModeIntra <= 80 | 1 |
| stPredModeIntra > 80 | 0 |

*FIG. 20*

VIDEO SIGNAL PROCESSING METHOD AND DEVICE USING SECONDARY TRANSFORM

CROSS-REFERENCE TO RELATED APPLICATIONS

This application is a continuation of pending U.S. application Ser. No. 17/348,227, which was filed on Jun. 15, 2021, and which is a continuation of pending PCT International Application No. PCT/KR2020/001853, which was filed on Feb. 10, 2020, and which claims priority under 35 U.S.C. 119(a) to Korean Patent Application No. 10-2019-0014736 filed with the Korean Intellectual Property Office on Feb. 8, 2019, Korean Patent Application No. 10-2019-0035438 filed with the Korean Intellectual Property Office on Mar. 27, 2019, and Korean Patent Application No. 10-2019-0051052 filed with the Korean Intellectual Property Office on Apr. 30, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

An aspect of the present disclosure is to increase coding efficiency of a video signal. Further, another aspect of the present disclosure is to increase signaling efficiency related to a motion information set of a current block.

Technical Solution

In order to solve the problems described above, the present invention provides the following video signal processing device and video signal processing method.

According to an embodiment of the present invention, there is provided a video signal processing method comprising: determining whether or not a secondary inverse transform is applied to a current block; deriving when the secondary inverse transform is applied to the current block, a secondary transform kernel set applied to the current block from among predefined secondary transform kernel sets on the basis of an intra prediction mode of the current block; determining a secondary transform kernel applied to the current block in the derived secondary transform kernel set; generating a secondary inverse transformed block by performing a secondary inverse transform on a top-left specific region of the current block using the secondary transform kernel; and generating a residual block of the current block by performing a primary inverse transform on the secondary inverse transformed block, wherein an input of the secondary inverse transform is an inverse quantized transform coefficient based on a fixed scan order regardless of a size of the secondary transform kernel.

As an embodiment, the generating the secondary inverse transformed block may comprise allocating the inverse quantized transform coefficient to an input coefficient array of the secondary inverse transform on the basis of an up-right diagonal scan order.

As an embodiment, the up-right diagonal scan order may be predefined as a scan order for a block having a size of 4×4.

As an embodiment, the determining whether or not the secondary inverse transform is applied to the current block may comprise obtaining when a predefined condition is satisfied, a syntax element indicating whether or not a secondary transform is applied to the current block, and the predefined condition may include whether or not a width and a height of the current block are less than or equal to a maximum transform size.

As an example, the determining whether or not the secondary inverse transform is applied to the current block may comprise inferring when the predefined condition is not satisfied, the syntax element as 0.

As an example, when the value of the syntax element is 0, the secondary transform may be determined as being not applied to the current block, and when the value of the syntax element is not 0, a secondary transform kernel applied to the current block may be determined in the derived secondary transform kernel set depending on the value of the syntax element.

As an example, when the width or height of the current block is greater than the maximum transform size, the current block may be split into a plurality of transform units.

According to an embodiment of the present invention, there is provided a video signal processing device comprising a processor, the processor being configured to determine whether or not a secondary inverse transform is applied to a current block, derive when the secondary inverse transform is applied to the current block, a secondary transform kernel set applied to the current block from among predefined secondary transform kernel sets on the basis of an intra prediction mode of the current block, determine a secondary transform kernel applied to the current block in the derived secondary transform kernel set, generate a secondary inverse transformed block by performing the secondary inverse transform on a top-left specific region of the current block using the secondary transform kernel, and generate a residual block of the current block by performing a primary inverse transform on the secondary inverse transformed block, wherein an input of the secondary inverse transform is an inverse quantized transform coefficient based on a fixed scan order regardless of a size of the secondary transform kernel.

As an embodiment, the processor may be configured to allocate the inverse quantized transform coefficient to an input coefficient array of the secondary inverse transform on the basis of an up-right diagonal scan order.

As an embodiment, the up-right diagonal scan order may be predefined as a scan order for a block having a size of 4×4.

As an embodiment, the processor may be configured to obtain when a predefined condition is satisfied, a syntax element indicating whether or not a secondary transform is applied to the current block, and the predefined condition may include whether or not a width and a height of the current block are less than or equal to a maximum transform size.

As an embodiment, the processor may be configured to infer when the predefined condition is not satisfied, the syntax element as 0.

As an example, when a value of the syntax element is 0, the secondary inverse transform is determined as being not applied to the current block, and when the value of the syntax element is not 0, a secondary transform kernel applied to the current block may be determined in the derived secondary transform kernel set depending on the value of the syntax element.

As an example, when the width or the height of the current block is greater than the maximum transform size, the current block may be split into a plurality of transform units.

According to an embodiment of the present invention, there is provided a video signal processing method comprising: determining whether or not a secondary transform is applied to a current block; deriving when the secondary transform is applied to the current block, a secondary transform kernel set applied to the current block from among predefined secondary transform kernel sets on the basis of an intra prediction mode of the current block; determining a secondary transform kernel applied to the current block in the derived secondary transform kernel set; generating a primary transformed block by performing a primary transform on a residual block of the current block; generating a secondary transformed block by performing the secondary transform on a top-left specific region of the primary transformed block using the secondary transform kernel; and generating a bitstream by encoding the secondary transformed block, wherein the secondary transform is performed by configuring secondary transformed coefficients as a transform coefficient array on the basis of a fixed scan order regardless of a size of the secondary transform kernel.

According to an embodiment of the present invention, there is provided a non-transitory computer-readable medium that stores a computer-executable component configured to be executed on one or more processors of a computing device, the computer-executable component being configured to determine whether or not a secondary inverse transform is applied to a current block, derive when the secondary inverse transform is applied to the current block, a secondary transform kernel set applied to the current block from among predefined secondary transform kernel sets on the basis of an intra prediction mode of the current block, determine a secondary transform kernel applied to the current block in the derived secondary transform kernel set, generate a secondary inverse transformed block by performing the secondary inverse transform on a top-left specific region of the current block using the secondary transform kernel, and generate a residual block of the current block by performing a primary inverse transform on the secondary inverse transformed block, wherein an input of the secondary inverse transform is an inverse quantized transform coefficient based on a fixed scan order regardless of a size of the secondary transform kernel.

Advantageous Effects

According to an embodiment of the present invention, coding efficiency of a video signal can be improved. In addition, according to an embodiment of the present invention, a transform kernel suitable for the current transform block can be selected.

BRIEF DESCRIPTION OF THE DRAWINGS

FIG. 8 is a diagram specifically illustrating a method for obtaining a residual signal by inverse transforming a transform coefficient by an encoder and a decoder.

FIG. 9 is a diagram showing the definition of a transform kernel used in an adaptive multiple core transform (AMT), and represents the formulas of a DCT-II, discrete cosine transform type-V (DCT-V), discrete cosine transform type-VIII (DCT-VIII), discrete sine transform type-I (DST-I), and DST-VII kernels applied to AMT.

FIG. 12 shows a transform kernel used in a multiple transform selection (MTS) technique, a transform set defined according to a prediction mode, and transform kernel candidates according to an embodiment of the present invention.

FIG. 17 is a diagram illustrating a method of determining an up-right diagonal scan order according to an embodiment of the present invention.

FIG. 18 is a diagram illustrating an up-right diagonal scan order according to an embodiment of the present invention according to a block size.

FIG. 19 is a diagram showing an example of a secondary transform process according to an embodiment of the present invention.

FIG. 20 is a diagram illustrating a secondary transform matrix derivation process according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
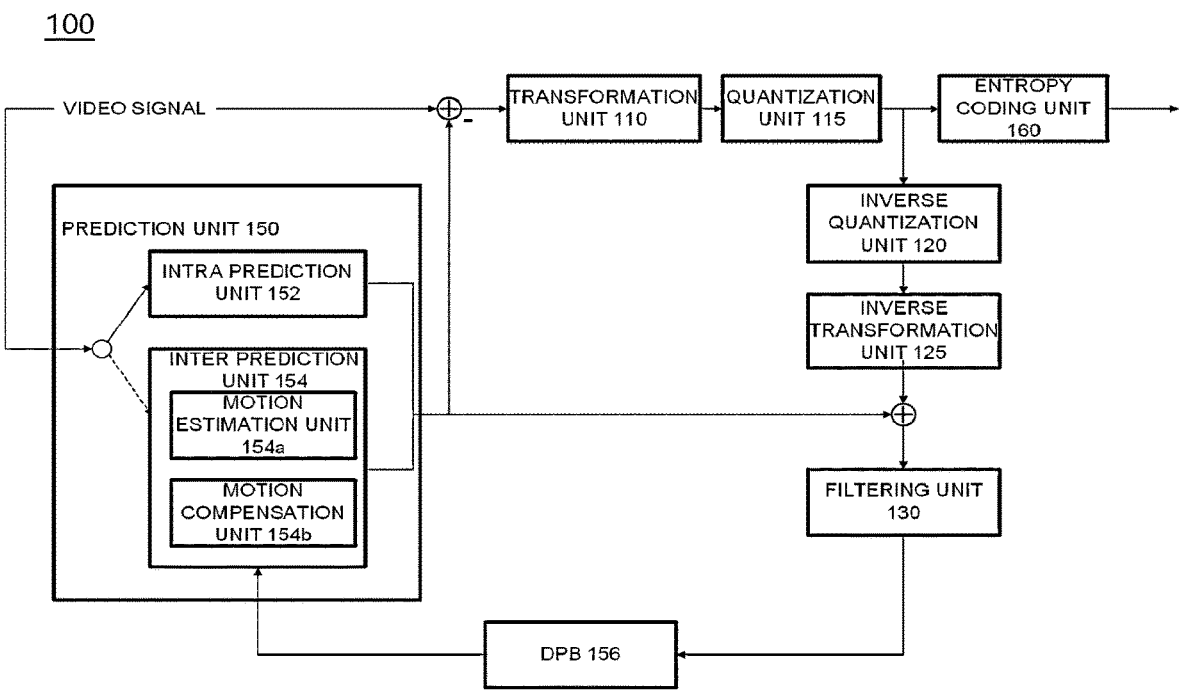
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture, is used. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device.

According to an embodiment, the operation of each element of the above-described encoding apparatus 100 may be performed by a processor (not shown).

Figure 2:
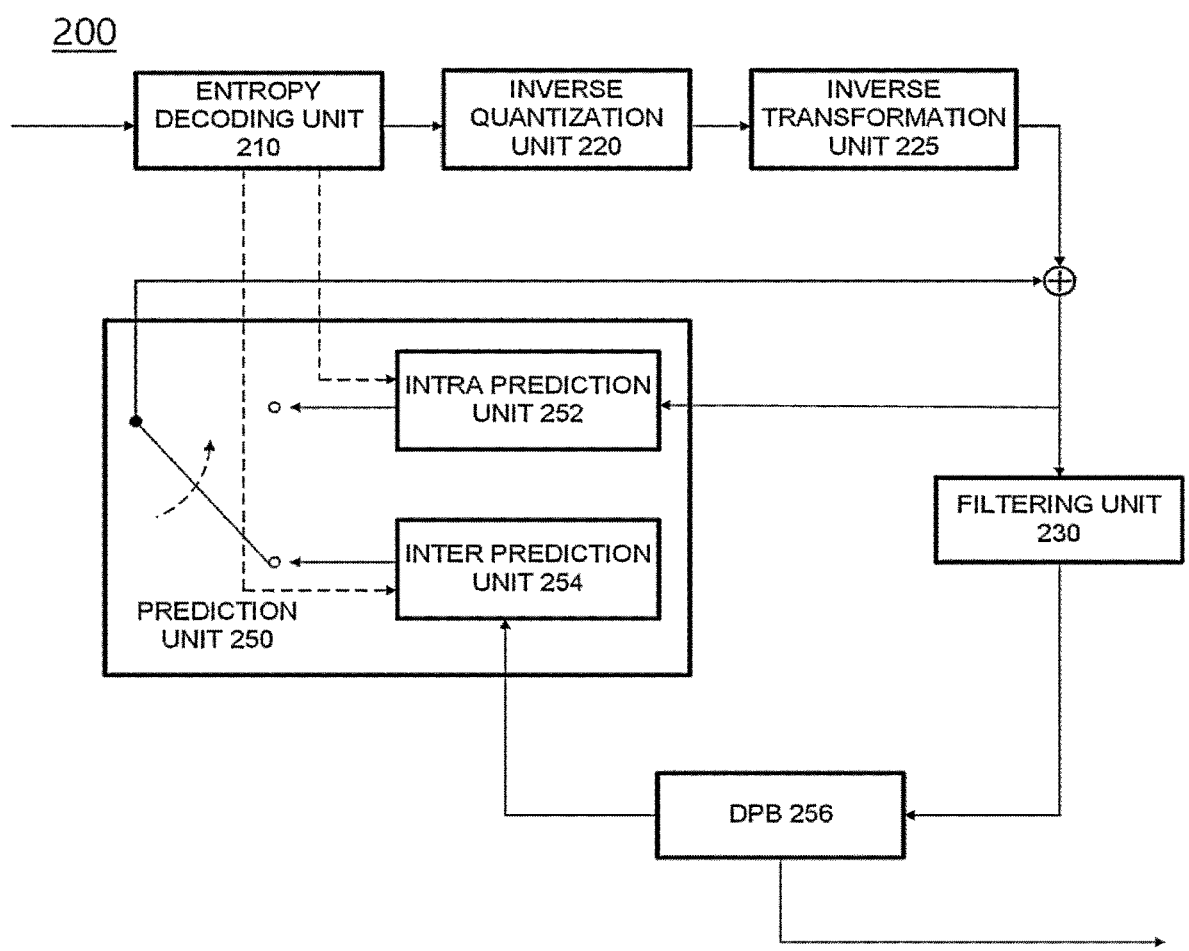
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
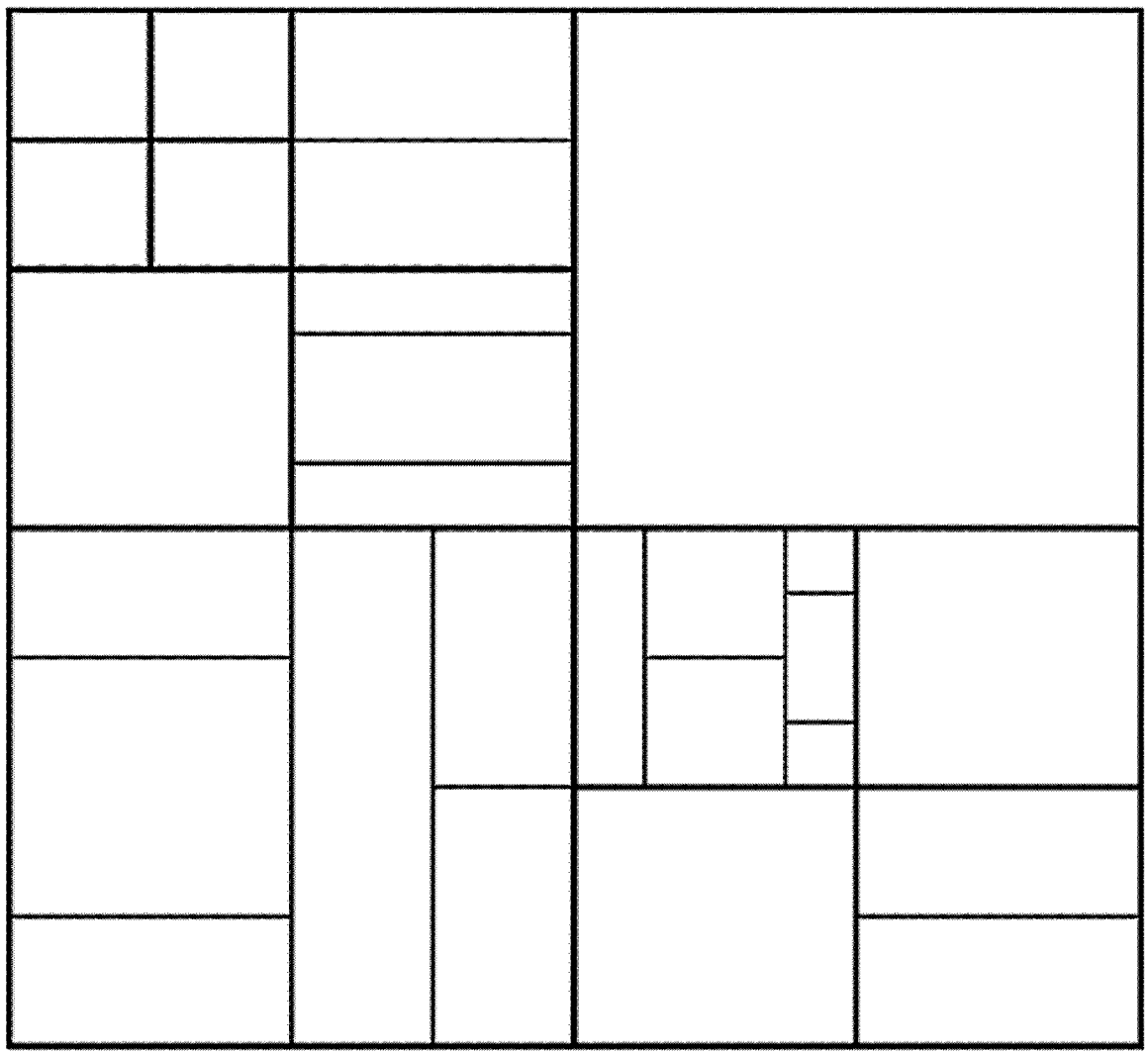
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal binary split. This multi-type tree split may be performed recursively.

The leaf node of the multi-type tree can be a coding unit. If the coding unit is not greater than the maximum transform length, the corresponding coding unit can be used as a unit of prediction and/or transform without further splitting. As an embodiment, if the width or height of the current coding unit is greater than the maximum transform length, the current coding unit may be split into a plurality of transform units without explicit signaling regarding splitting. Meanwhile, in the quad tree and multi-type tree described above, at least one of the following parameters may be defined in advance or transmitted through RBSP of a higher level set such as PPS, SPS, and VPS. 1) CTU size: root node size of quad tree, 2) Minimum QT size MinQtSize: Minimum QT leaf node size allowed, 3) Maximum BT size MaxBtSize: Mmaximum BT root node size allowed, 4) Maximum TT size MaxTtSize: Maximum TT root node size allowed, 5) Maximum MTT depth MaxMttDepth: Maximum allowable depth of MTT split from leaf node of QT, 6) Minimum BT size MinBtSize: Minimum BT leaf node size allowed, 7) Minimum TT size MinTtSize: Minimum TT leaf node size allowed.

Figure 4:
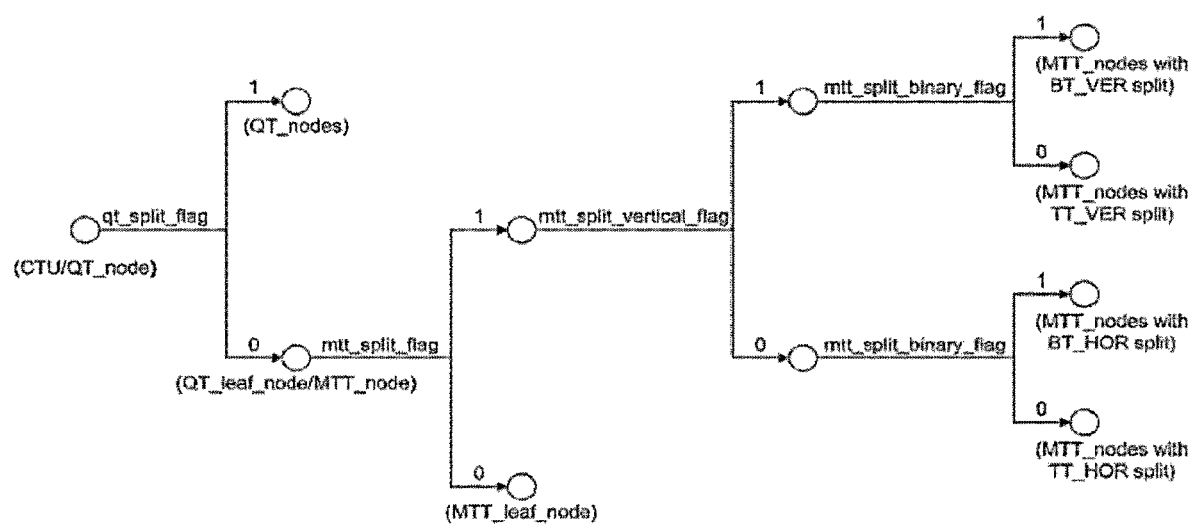
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
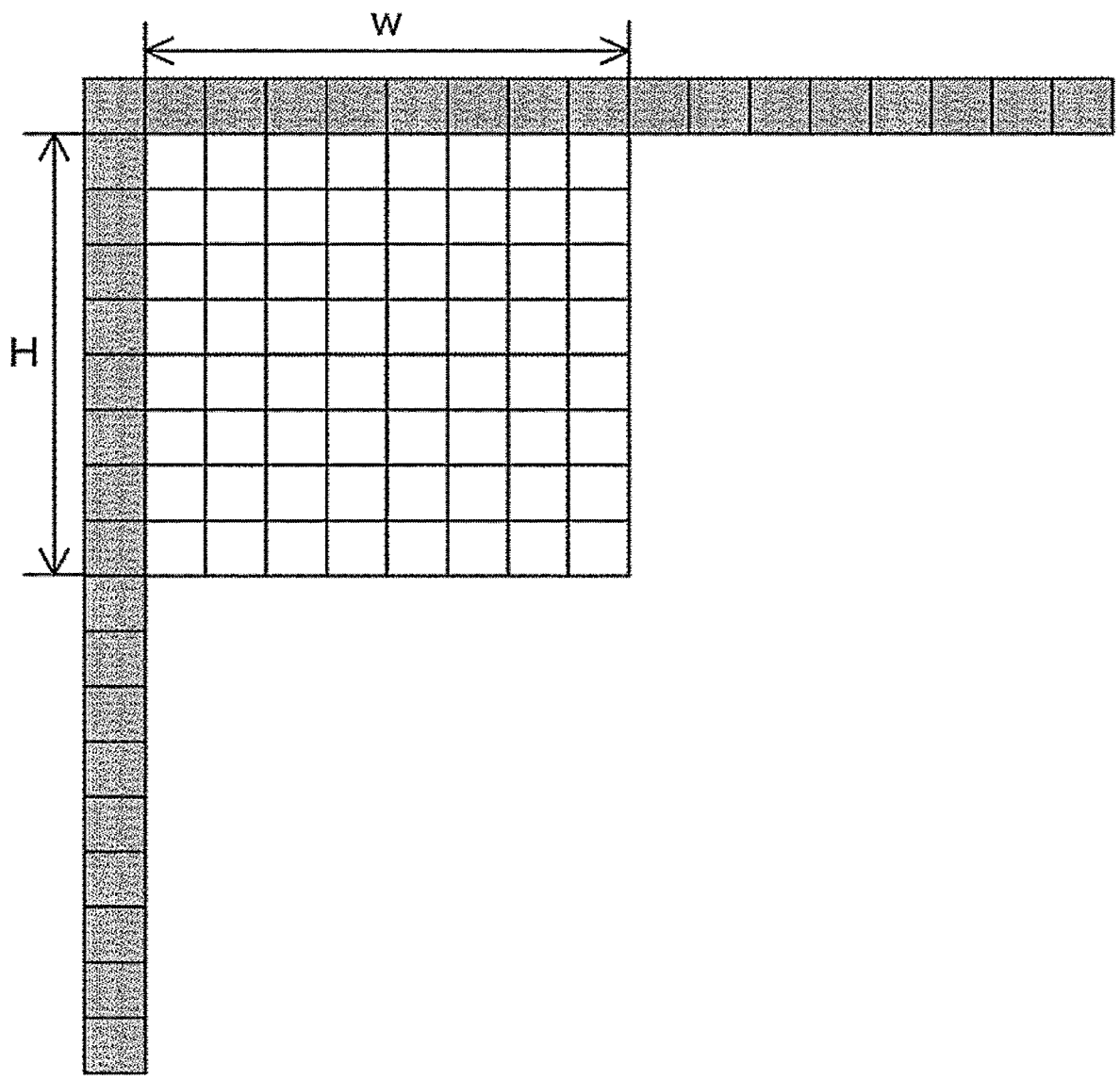
FIGS. 5 and 6 illustrate an intra-prediction method in more detail according to an embodiment of the present disclosure.
Figure 6:
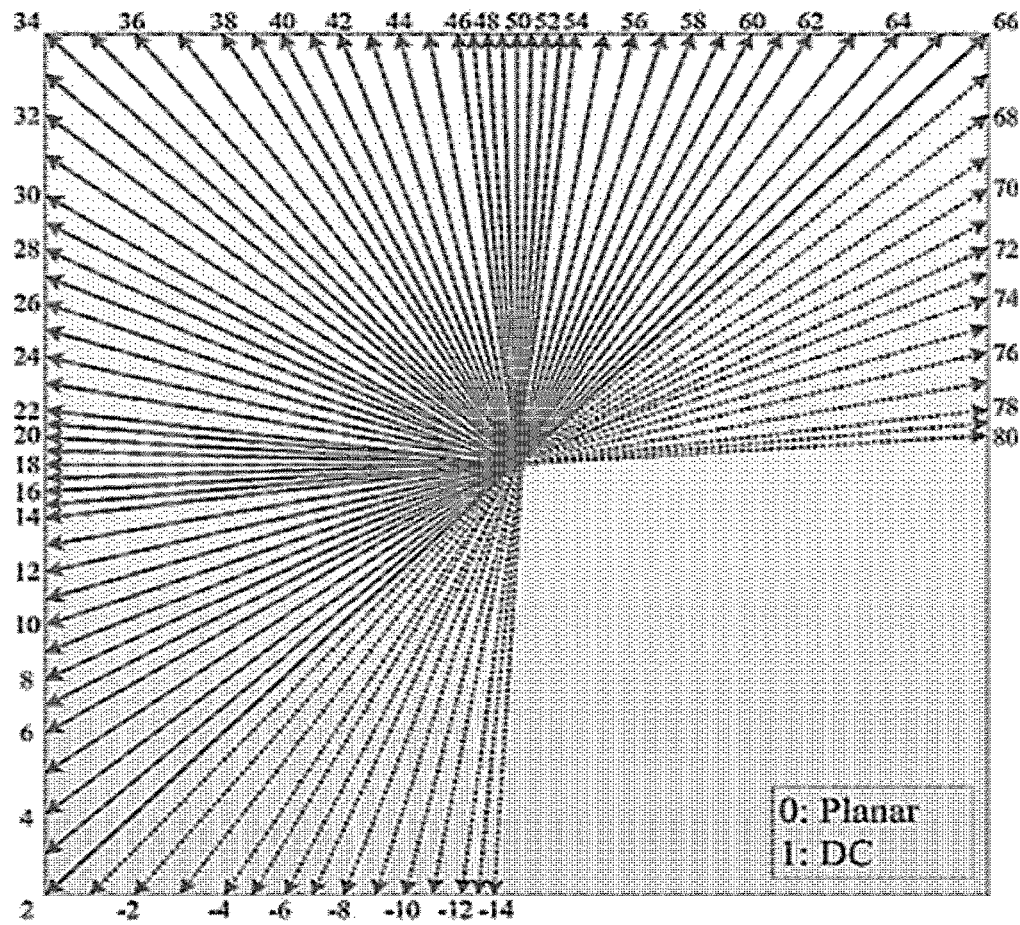

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently depending on a shape of the current block. For example, if the current block is a rectangular block, a wide angle mode indicating an angle exceeding 45 degrees or less than −135 degrees in a clockwise direction may be additionally used. When the current block is a horizontal block, an angle mode may indicate an angle within an angle range (i.e., a second angle range) between (45+offset1) degrees and (−135+offset1) degrees in a clockwise direction. In this case, angle modes 67 to 76 outside the first angle range may be additionally used. In addition, if the current block is a vertical block, the angle mode may indicate an angle within an angle range (i.e., a third angle range) between (45−offset2) degrees and (−135−offset2) degrees in a clockwise direction. In this case, angle modes −10 to −1 outside the first angle range may be additionally used. According to an embodiment of the present invention, values of offset1 and offset2 may be determined differently depending on a ratio between the width and height of the rectangular block. In addition, offset1 and offset2 may be positive numbers.

According to a further embodiment of the present invention, a plurality of angle modes configuring the intra prediction mode set may include a basic angle mode and an extended angle mode. In this case, the extended angle mode may be determined on the basis of the basic angle mode.

According to an embodiment, the basic angle mode is a mode corresponding to an angle used in intra prediction of the existing high efficiency video coding (HEVC) standard, and the extended angle mode may be a mode corresponding to an angle newly added in intra prediction of the next generation video codec standard. More specifically, the basic angle mode may be an angle mode corresponding to any one of the intra prediction modes {2, 4, 6, . . . , 66}, and the extended angle mode may be an angle mode corresponding to any one of the intra prediction modes {3, 5, 7, . . . , 65}. That is, the extended angle mode may be an angle mode between basic angle modes within the first angle range. Accordingly, the angle indicated by the extended angle mode may be determined on the basis of the angle indicated by the basic angle mode.

According to another embodiment, the basic angle mode may be a mode corresponding to an angle within a preset first angle range, and the extended angle mode may be a wide angle mode outside the first angle range. That is, the basic angle mode may be an angle mode corresponding to any one of the intra prediction modes {2, 3, 4, . . . , 66}, and the extended angle mode may be an angle mode corresponding to any one of the intra prediction modes {−10, −9, . . . , −1} and {67, 68, . . . , 76}. The angle indicated by the extended angle mode may be determined as an angle on a side opposite to the angle indicated by the corresponding basic angle mode. Accordingly, the angle indicated by the extended angle mode may be determined on the basis of the angle indicated by the basic angle mode. Meanwhile, the number of extended angle modes is not limited thereto, and additional extended angles may be defined according to the size and/or shape of the current block. For example, the extended angle mode may be defined as an angle mode corresponding to any one of the intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the embodiments described above, the spacing between the extended angle modes may be set on the basis of the spacing between the corresponding basic angle modes. For example, the spacing between the extended angle modes {3, 5, 7, . . . , 65} may be determined on the basis of the spacing between the corresponding basic angle modes {2, 4, 6, . . . , 66}. In addition, the spacing between the extended angle modes {−10, −9, . . . , −1} may be determined on the basis of the spacing between corresponding basic angle modes {56, 57, . . . , 65} on the opposite side, and the spacing between the extended angle modes {67, 68, . . . , 76} may be determined on the basis of the spacing between the corresponding basic angle modes {3, 4, . . . , 12} on the opposite side. The angular spacing between the extended angle modes may be set to be the same as the angular spacing between the corresponding basic angle modes. In addition, the number of extended angle modes in the intra prediction mode set may be set to be less than or equal to the number of basic angle modes.

According to an embodiment of the present invention, the extended angle mode may be signaled on the basis of the basic angle mode. For example, the wide angle mode (i.e., the extended angle mode) may replace at least one angle mode (i.e., the basic angle mode) within the first angle range. The basic angle mode to be replaced may be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced may be remapped to the wide angle mode to signal the corresponding wide angle mode. For example, the wide angle modes {−10, −9, . . . , −1} may be signaled by the intra prediction mode indices {57, 58, . . . , 66}, respectively, and the wide angle modes {67, 68, . . . , 76} may be signaled by the intra prediction mode indices {2, 3, . . . , 11}, respectively. In this way, the intra prediction mode index signals the extended angle mode, and thus the same set of intra prediction mode indices may be used for signaling of the intra prediction mode even if the configuration of the angle modes used for intra prediction of each block are different from each other. Accordingly, signaling overhead due to a change in the intra prediction mode configuration may be minimized.

Meanwhile, whether or not to use the extended angle mode may be determined on the basis of at least one of the shape and size of the current block. According to an embodiment, if the size of the current block is greater than a preset size, the extended angle mode may be used for intra prediction of the current block, otherwise, only the basic angle mode may be used for intra prediction of the current block. According to another embodiment, if the current block is a block other than a square, the extended angle mode may be used for intra prediction of the current block, and if the current block is a square block, only the basic angle mode may be used for intra prediction of the current block.

Meanwhile, in order to improve coding efficiency, a method of quantizing a transform coefficient value obtained by transforming a residual signal and coding the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 7:
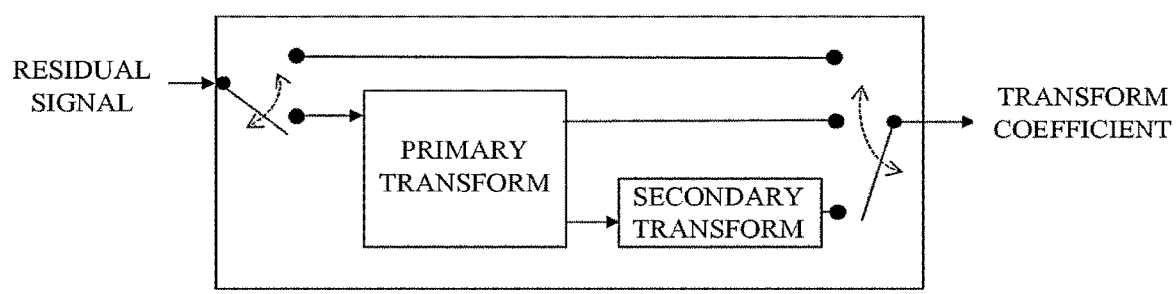
FIG. 7 is a diagram specifically illustrating a method for transforming a residual signal by an encoder.

FIG. 7 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 7, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether or not to perform the secondary transform can be determined depending on the size of the current block or the residual block. In addition, transform kernels having different sizes may be used depending on the size of the current block or the residual block. For example, 8×8 secondary transform may be applied to a block whose length of a shorter side of the width and height is greater than or equal to a first preset length. In addition, 4×4 secondary transform may be applied to a block whose length of the shorter side of the width and height is greater than or equal to a second preset length and less than the first preset length. In this case, the first preset length may be a value greater than the second preset length, but the present disclosure is not limited thereto. In addition, unlike primary transform, secondary transform may not be performed separately into vertical transform and horizontal transform. This secondary transform may be referred to as a low frequency non-separable transform (LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 7 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

FIG. 8 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal. The primary inverse transform described above represents inverse transform of the primary transform, and may be referred to as inverse primary transform. The secondary inverse transform represents inverse transform of the secondary transform, and may be referred to as inverse secondary transform or inverse LFNST. In the present invention, a primary (inverse) transform may be referred to as a first (inverse) transform, and a secondary (inverse) transform may be referred to as a second (inverse) transform.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Meanwhile, a distribution of the residual signals of a picture may be different for each region. For example, a distribution of values for the residual signal in a specific region may vary depending on a prediction method. IF transform is performed on a plurality of different transform regions using the same transform kernel, coding efficiency may vary for each transform region depending on distributions and characteristics of values in the transform regions. Accordingly, if a transform kernel used for transform of specific transform block is adaptively selected from among a plurality of transform kernels that may be used, coding efficiency may be further improved. That is, the encoder and decoder may additionally be configured to use a transform kernel other than the basic transform kernel in transforming a video signal. A method of adaptively selecting the transform kernel may be referred to as adaptive multiple core transform (AMT) or multiple transform selection (MTS). The method of adaptively selecting the transform kernel will be described later with reference to related drawings. In the present disclosure, for convenience of description, transform and inverse transform are collectively referred to as transform. In addition, the transform kernel and the inverse transform kernel are collectively referred to as a transform kernel.

The residual (residual) signal, which is a difference signal between the original signal and the prediction signal generated through inter screen prediction or intra screen prediction, has energy distributed over the entire region of the pixel domain, and thus if the pixel value of the residual signal itself is encoded, a problem occurs in that compression efficiency is deteriorated. Accordingly, a process of concentrating energy of the residual signal in the low frequency region of the frequency domain through transcoding of the residual signal in the pixel domain is required.

In the high efficiency video coding (HEVC) standard, the residual signal in the pixel domain is transformed into the frequency domain by mostly using a discrete cosine transform type-II (DCT-II), which is efficient if the signal is evenly distributed in the pixel domain (if the neighboring pixel values are similar) and using a discrete sine transform type-VII (DST-VII) limitedly only for the intra screen predicted 4×4 block. In the case of DCT-II transform, it may be suitable for a residual signal generated through inter screen prediction (if energy is evenly distributed in the pixel domain), but in the case of the residual signal generated through intra screen prediction, energy of the residual signal may tend to increase as the distance from the reference sample increases due to the characteristics of intra screen prediction in which prediction is made using the reconstructed reference samples around the current encoding unit. Therefore, if only DCT-II transform is used, high encoding efficiency may not be achieved.

AMT is a transform technique that adaptively selects a transform kernel from among several preset transform kernels according to the prediction method, and in AMT, since the pattern in the pixel domain of the residual signal (characteristics of the signal in the horizontal direction and characteristics of the signal in the vertical direction) varies depending on which prediction method is used, higher encoding efficiency may be expected when only DCT-II is used. In the present invention, AMT is not limited to its name, and may be referred to as multiple transform selection (MTS).

FIG. 9 is a diagram showing the definition of a transform kernel used in AMT, and represents the formulas of a DCT-II, discrete cosine transform type-V (DCT-V), discrete cosine transform type-VIII (DCT-VIII), discrete sine transform type-I (DST-I), and DST-VII kernels applied to AMT.

DCT and DST may be expressed as a function of cosine and sine, respectively. If the basis function of the transform kernel for the number of samples N is expressed as $T_i(j)$, an index i represents an index in the frequency domain, and an index j represents an index in the basis function. That is, as i becomes smaller, it represents the low frequency basis function, and as i becomes larger, it represents the high frequency basis function. When being expressed as a two-dimensional matrix, the basis function $T_i(j)$ may represent a j-th element of an i-th row, and all the transform kernels shown in FIG. 9 have separable characteristics, and thus transform may be performed on a residual signal X in a horizontal direction and a vertical direction, respectively. That is, when the residual signal block is denoted by X and a transform kernel matrix is denoted by T, transform of the residual signal X may be represented as TXT'. In this case, T' means a transpose matrix of the transform kernel matrix T.

Values of the transform matrix defined by the basis function shown in FIG. 9 may be in a decimal form rather than an integer form. It may be difficult to implement values in the form of decimals in hardware terms in a video encoding device and decoding device. Accordingly, a transform kernel approximated by an integer from an original transform kernel including values in the form of decimals may be used for encoding and decoding of a video signal. An approximated transform kernel including values in the form of integers may be generated through scaling and rounding of the original transform kernel. The integer value included in the approximated transform kernel may be a value within a range that may be expressed by a preset number of bits. The preset number of bits may be an 8-bit or 10-bit. Depending on the approximation, an orthonormal property of DCT and DST may not be maintained. However, the encoding efficiency loss due to the approximation is not large, and thus approximating the transform kernel to an integer form may be advantageous in terms of hardware implementation.

Figures 10, 11:
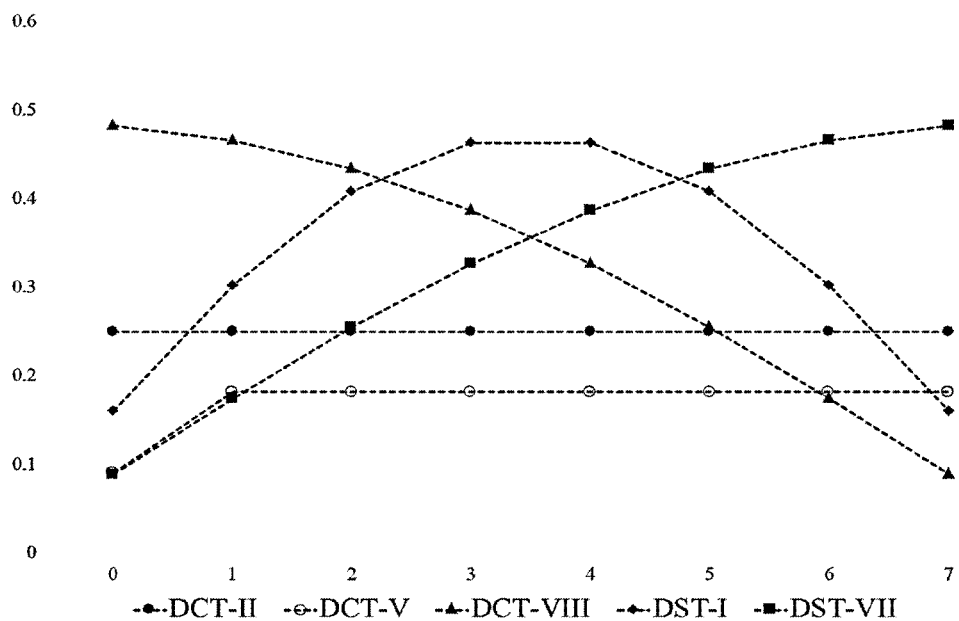
FIG. 10 is a diagram illustrating a transform set according to an intra prediction mode and transform kernel candidates defined according to the transform set in AMT.
FIG. 11 is a diagram showing a 0-th (lowest frequency component of the corresponding transform kernel) basis function of DCT-II, DCT-V, DCT-VIII, DST-I, and DST-VII transform defined in FIG. 9.

FIG. 10 is a diagram representing a transform set according to an intra screen prediction mode and transform kernel candidates defined according to the transform set in AMT. Intra screen prediction may be configured with non-directional prediction {INTRA_PLANAR (mode 0), INTRA_DC (mode 1)} and directional prediction {INTRA_ANGULAR2, INTRA_ANGULAR3, . . . , INTRA_ANGULAR66} by using reconstructed reference samples around the encoding unit and may additionally include a wide angle prediction mode applied to a rectangular block and a cross-component linear model (CCLM) for predicting a chroma component signal from a reconstructed luma component signal. The pattern in the horizontal direction and the vertical direction of the residual signal block may be different depending on the intra prediction method, and thus a set of transform kernels that may be used according to the prediction mode is used, and the transform candidate index used in the set is signaled with 1-bit for each of the horizontal and vertical directions, so that the decoder may perform inverse transform by applying an optimal transform kernel found in the encoder. FIG. 10(a) shows transform set indices defined, if 67 intra screen prediction modes are used, according to the prediction mode, and V(vertical) represents a transform set applied to the vertical direction, and H(horizontal) represents a transform set applied to the horizontal direction. Different transform sets may be used depending on the intra screen prediction mode, and transform sets applied to the horizontal and vertical directions in a specific prediction mode may be different. FIG. 10(b) shows transform sets used in intra screen prediction and transform kernel candidates that may be used according to the transform set. Transform Set 0 is configured with {DST-VII, DCT-VIII}, Transform Set 1 is configured with {DST-VII, DST-I}, and Transform Set 2 is configured with {DST-VII, DCT-V}. In the case of intra screen prediction, due to the characteristics of intra screen prediction in which prediction is made by utilizing the reconstructed reference samples around the current block, energy of the residual signal tends to increase as the distance from the reference sample increases, that is, in the horizontal direction and the vertical direction with the top-left coordinate of the residual signal block as a reference, and thus DST-VII, which expresses this well, is effective. Accordingly, DST-VII may be included in all transform sets.

FIG. 10(c) shows a transform set used in inter screen prediction and transform kernel candidates that may be used according to the transform set. In the case of inter screen prediction, there is only one transform set that may be used, and is configured with Transform set 0 {DCT-VIII, DST-VII}.

AMT is applicable only to the luma component, and for the chroma component, DCT-II transform may be used like HEVC. On/off may be indicated with a 1-bit flag so that AMT may be controlled in units of encoding units, and if this flag indicates off, DCT-II, which is a basic kernel, may be used like the chroma component. On the other hand, if this flag indicates on, a transform candidate index used in the preset transform set according to the prediction mode may be signaled and the decoder may perform inverse transform by applying a transform kernel corresponding to the index. Different transforms may be applied to the horizontal and vertical directions, and thus the transform index to be used may be indicated with a total of 2-bit of which each 1-bit for each of the vertical and horizontal directions. In the case of intra screen prediction, even if the flag indicating that AMT is applied to the corresponding block is on, the transform candidate index may not be signaled depending on the number of non-zero coefficients. For example, if the number of non-zero coefficients is one or two, the transform candidate index is not signaled, and in this case, encoding and decoding are performed on both the horizontal and vertical directions using DST-VII.

FIG. 11 is a diagram showing a 0-th (lowest frequency component of the corresponding transform kernel) basis function of DCT-II, DCT-V, DCT-VIII, DST-I, and DST-VII transform defined in FIG. 9. FIG. 11 is a graph when N is 8 and i is 0 for Ti(j), which is the transform basis function of DCT/DST defined in FIG. 9, and the horizontal axis represents an index j (j=0, 1, . . . , N−1) in the transform basis function and the vertical axis represents a magnitude value of signal.

As shown in FIG. 11, in DST-VII, the magnitude of signal tends to increase as the index j increases, and thus DST-VII, like intra screen prediction, may be efficient for a pattern of a residual signal in which energy of the residual signal increases as the distance in the horizontal and vertical directions increases with the top-left coordinate of the block in the residual block as a reference.

On the other hand, in the case of DCT-VIII, the magnitude of signal tends to decrease as the index j increases, and thus DCT-VIII may be efficient for a pattern of a residual signal in which energy of the residual signal decreases as the distance in the horizontal and vertical directions increases with the top-left coordinate of the block in the residual block as a reference.

In the case of DST-I, as the index j in the basis function increases, the signal increases, and then the magnitude of signal decreases starting from a specific index. Accordingly, it may be efficient for a pattern of a residual signal in which energy of the residual signal increases as it moves to the center of the residual block.

In the case of DCT-II, the 0-th basis function represents DC, and DCT-II may be effective for a pattern of a residual signal having a uniform distribution of pixel values in a residual block, like inter screen prediction.

In the case of DCT-V, it is similar to DCT-II, but the value when j is 0 is less than the value when j is not 0, it has a signal model in which the straight line is bent when j is 1.

In the case of the existing video codec mainly using only DCT-II, optimal coding efficiency may not be achieved because it may not adaptively perform transform on the pattern of the residual signal that varies depending on the prediction mode and the characteristics of the original signal, but, in the case of AMT performing transcoding by selecting a transform kernel optimized for the pattern of the residual signal by using various transform kernels differently depending on the prediction mode, high compression efficiency may be expected. Similar to the AMT, a multiple transform selection (MTS) technique is a transcoding method capable of improving encoding efficiency by adaptively selecting a transform kernel according to a prediction mode.

FIG. 12 shows a transform kernel used in MTS and a transform set defined according to a prediction mode and transform kernel candidates according to an embodiment of the present invention. FIG. 12(a) represents the formulas of basis functions configuring DCT-II, DCT-VIII, and DST-VII kernels used in MTS. DCT and DST may be expressed as a function of cosine and sine, respectively. If the basis function of the transform kernel for the number of samples N is expressed as Ti(j), an index i represents an index in the frequency domain, and an index j represents an index in the basis function. That is, as i becomes smaller, it represents the low frequency basis function, and as i becomes larger, it represents the high frequency basis function. When being expressed as a two-dimensional matrix, the basis function Ti(j) may represent a j-th element of an i-th row, and all the transform kernels shown in FIG. 12(a) have separable characteristics, and thus transform may be performed on the residual signal X in a horizontal direction and a vertical direction, respectively. That is, when the residual signal block is denoted by X and the transform kernel matrix is denoted by T, transform of the residual signal X may be represented as TXT'. In this case, T' means a transpose matrix of the transform kernel matrix T.

As described above with reference to FIG. 9, values of the transform matrix defined by the basis function may be in a decimal form rather than an integer form. It may be difficult to implement values in the form of decimals in hardware terms in a video encoding device and decoding device. Accordingly, a transform kernel approximated by an integer from an original transform kernel including values in the form of decimals may be used for encoding and decoding of a video signal. An approximated transform kernel including values in the form of integers may be generated through scaling and rounding of the original transform kernel. The integer value included in the approximated transform kernel may be a value within a range that may be expressed by a preset number of bits. The preset number of bits may be an 8-bit or 10-bit. Depending on the approximation, an orthonormal property of DCT and DST may not be maintained. However, the encoding efficiency loss due to the approximation is not large, approximating the transform kernel to an integer form may be advantageous in terms of hardware implementation.

FIGS. 12(b) and 12(c) are diagrams representing a transform set according to an intra screen prediction mode and transform kernel candidates defined according to the transform set. Intra screen prediction may be configured with non-directional prediction {INTRA_PLANAR (mode 0), INTRA_DC (mode 1)} and directional prediction {INTRA_ANGULAR2, INTRA_ANGULAR3, . . . , INTRA_ANGULAR66} by using reconstructed reference samples around the encoding unit, and may additionally include a wide angle prediction mode applied to a rectangular block and a cross-component linear model (CCLM) for predicting a chroma component signal from a reconstructed luma component signal. The pattern in the horizontal direction and the vertical direction of the residual signal block may be different depending on the intra prediction method, and thus a set of transform kernels that may be used according to the prediction mode is used, and the transform candidate index used in the set is signaled with 1-bit, so that the decoder may perform inverse transform by applying an optimal transform kernel found in the encoder. FIG. 12(b) shows transform set indices defined, if 67 intra screen prediction modes are used, according to the prediction mode, and V(vertical) represents a transform set applied to the vertical direction, and H(horizontal) represents a transform set applied to the horizontal direction. Different transform sets may be used depending on the intra screen prediction mode, and transform sets applied to the horizontal and vertical directions in a specific prediction mode may be different. FIG. 12(c) shows transform sets used in intra screen prediction and transform kernel candidates that may be used according to the transform set. All of Transform sets 0, 1, and 2 are configured with {DST-VII, DCT-VIII}. That is, although it may be interpreted as using one transform set regardless of the intra screen prediction mode (the same transform kernel candidate is used for all intra screen prediction modes), but each transform set may be configured with different transform kernel candidates, like AMT. The transform kernel matrix may be approximated from a circular matrix of a real-number form to an integer form, which may be expressed with 8-bit or 10-bit precision. All of these transform kernels should be stored in a memory of the encoder and decoder in advance, and thus, as the number types of transform kernels increases, burden on the memory of the encoder and decoder increases. Accordingly, it is possible to reduce a memory capacity required for storing the transform kernel by using only the DCT-II, DCT-VIII, and DST-VII-based transform kernels, which have the greatest effect on the encoding efficiency performance.

FIG. 12(d) shows a transform set used in inter screen prediction and a transform kernel candidate that may be used according to the transform set. In the case of inter screen prediction, there is only one transform set that may be used, and is configured with Transform set 0 {DST-VII, DCT-VIII}.

MTS is applicable only to the luma component, and DCT-II transform may be used for the chroma component. On/off may be indicated with a 1-bit flag so that AMT may be controlled in units of encoding units, and if this flag indicates off, DCT-II, which is a basic kernel, may be applied to the horizontal direction and vertical direction like the chroma component. On the other hand, if this flag indicates on, a transform candidate index used in the preset transform set according to the prediction mode may be signaled and the decoder may perform inverse transform by applying a transform kernel corresponding to the index. Different transforms may be applied to the horizontal and vertical directions, and thus the transform index to be used may be indicated with a total of 2-bit of which each 1-bit for each of the vertical and horizontal directions. Alternatively, the transform index may be indicated using a truncated unary binarization method. For example, if two DST-VII and DCT-VIII-based kernels may be used, there are four combinations of transform kernels applicable to the current block, and the encoder may signal the four combinations to the decoder as follows.

{Horizontal: DST-VII, Vertical: DST-VII}, 0
{Horizontal: DCT-VIII, Vertical: DST-VII}, 10

{Horizontal: DST-VII, Vertical: DCT-VIII}, 110
{Horizontal: DCT-VIII, Vertical: DCT-VIII}, 111

There is a high probability that the combination {Horizontal: DST-VII, Vertical: DST-VII} is statistically selected in MTS, and thus if the transform kernel is signaled using the truncated unary binarization method described above rather than signaling the transform kernel using a 2-bit of fixed length, an improvement in encoding efficiency may be expected.

As another embodiment indicating the transform kernel, a 1-bit on/off flag for controlling MTS and an index indicating the transform kernel may be signaled with one syntax element. For example, mts_idx may be expressed as a binary code using a truncated unary binarization method, and may indicate a transform kernel applied to the horizontal direction and the vertical direction.

If mts_idx is 0 (binary code 0), it may represent that a DCT-II-based kernel is applied to both the horizontal direction and the vertical direction.

If mts_idx is 1 (binary code 10), it may represent that a DST-VII-based kernel is applied to both the horizontal direction and the vertical direction.

If mts_idx is 2 (binary code 110), it may represent that a DCT-VIII-based kernel is applied to the horizontal direction, and may represent that a DST-VII-based kernel is applied to the vertical direction.

If mts_idx is 3 (binary code 1110), it may represent that the DST-VII-based kernel is applied to the horizontal direction, and may represent that the DCT-VIII-based kernel is applied to the vertical direction.

If mts_idx is 4 (binary code 1111), it may represent that the DCT-VIII-based kernel is applied to both the horizontal direction and the vertical direction.

In the case of the primary transform and the inverse primary transform in FIGS. 7 to 8 described above, transform is performed in the vertical direction and the horizontal direction by expressing the separable transform kernel as a two-dimensional matrix, and thus it may be regarded as performing a two-dimensional matrix multiplication operation twice. This is accompanied by a large amount of calculation, and thus it may be a problem from an implementation standpoint. Accordingly, from an implementation standpoint, it may be an important issue whether the amount of calculation may be reduced, like DCT-II, by using a combination structure of a butterfly structure or a half butterfly structure and a half matrix multiplier or whether the corresponding transform kernel may be decomposed into transform kernels with low implementation complexity (whether the kernel may be expressed by a product of matrices with low complexity). In addition, the elements of the transform kernel (matrix elements of the transform kernel) should be stored in a memory for calculation, and thus the memory capacity for storing the kernel matrix should also be considered in implementation. From this point of view, DST-VII and DCT-VIII have a high implementation complexity, and thus, in transform with similar characteristics to DST-VII and DCT-VIII while having low implementation complexity, DST-VII and DCT-VIII may be replaced.

The discrete sine transform type-IV (DST-IV) and the discrete cosine transform type-IV (DCT-IV) may be regarded as candidates that may replace DST-VII and DCT-VIII, respectively. The DCT-II kernel for the number of samples 2N includes the DCT-IV kernel for the number of samples N, and the DST-IV kernel for the number of samples N may be implemented by arranging a sign inversion which is a simple operation and a corresponding basis function in reverse order from the DCT-IV kernel for the number of samples N, and thus DST-IV and DCT-IV for the number of samples N may be simply derived from DCT-II for the number of samples 2N.

Figure 13:
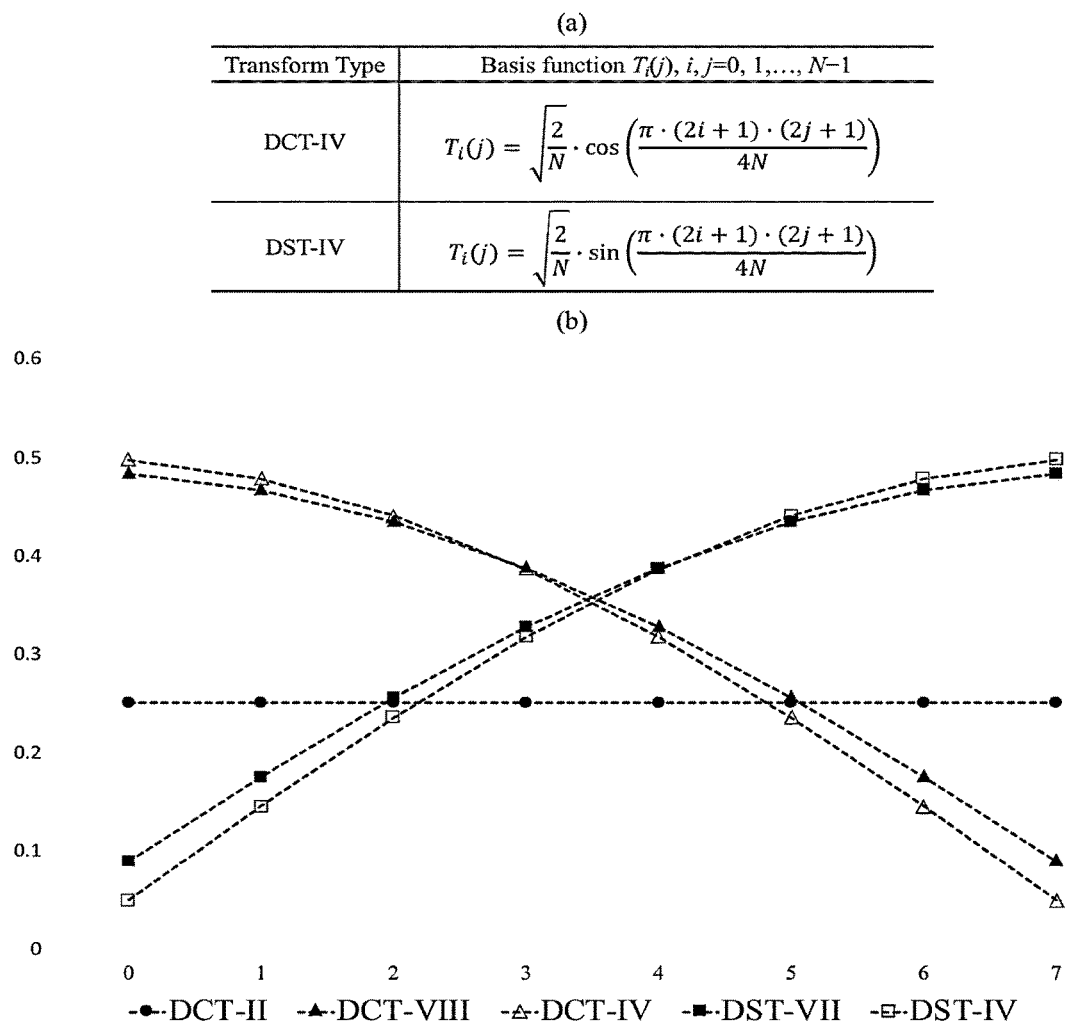
FIG. 13 is a diagram showing the definition of DST-IV and DCT-IV basis functions according to an embodiment of the present invention and a graph of a 0-th (lowest frequency component) basis function of DCT-II, DCT-IV, DCT-VIII, DST-IV, and DST-VII.

FIG. 13 is a diagram showing the definition of DST-IV and DCT-IV basis functions according to an embodiment of the present invention and a graph of a 0-th (lowest frequency component) basis function of DCT-II, DCT-IV, DCT-VIII, DST-IV, and DST-VII. FIG. 13 is a graph when N is 8 and i is 0 for Ti(j), which is the transform basis function of DCT/DST defined in FIG. 12(a) and FIG. 13(a), and the horizontal axis represents an index j (j=0, 1, . . . , N−1) in the transform basis function and the vertical axis represents a magnitude value of signal.

DST-IV and DST-VII are similar signal models and in DST-IV and DST-VII, the signal tends to increase as the index j increases, and thus DST-IV and DST-VII, like intra screen prediction, may be efficient for a pattern of a residual signal in which energy of the residual signal increases as the distance in the horizontal and vertical directions increases with the top-left coordinate of the block in the residual block as a reference.

DCT-IV and DCT-VIII are similar signal models and in DCT-IV and DCT-VIII, the magnitude of signal tends to decrease as the index j increases, and thus DCT-IV and DCT-VIII may be efficient for a pattern of a residual signal in which energy of the residual signal decreases as the distance in the horizontal and vertical directions increases with the top-left coordinate of the block in the residual block as a reference.

The pattern of the residual signal is affected not only by the prediction method but also by the block size, and thus a transform kernel set may be configured in consideration of this. For 4-point (4 residual signal pixels), DST-IV/DCT-IV tends to be able to express the residual signal more efficiently than DST-VII/DCT-VIII, and thus a 4×4 DST-VII kernel may be replaced with a 4×4 DST-IV kernel, and a 4×4 DCT-VIII kernel may be replaced with a 4×4 DCT-IV kernel. As for the transform kernels of the remaining sizes, DST-VII and DCT-VIII described in FIG. 12 may be used.

The residual signal, which is the difference between the original signal and the predicted signal, has a characteristic that the energy distribution of the signal varies depending on the prediction method, and thus if the transform kernel is adaptively selected according to the prediction method like AMT or MTS, encoding efficiency may be improved. In addition, as in FIGS. 7 to 8 described above, the encoding efficiency may be improved by performing secondary transform and inverse secondary transform (inverse transform corresponding to secondary transform), which are additional transforms, in addition to primary transform and inverse primary transform (inverse transform corresponding to primary transform). In particular, the secondary transform may improve energy compaction for an intra screen predicted residual signal block in which strong energy is highly likely to exist in a direction other than the horizontal or vertical direction of the residual signal block. As described above, this secondary transform may be referred to as a low frequency non-separable transform (LFNST). In addition, the primary transform may be referred to as core transform.

Figure 14:
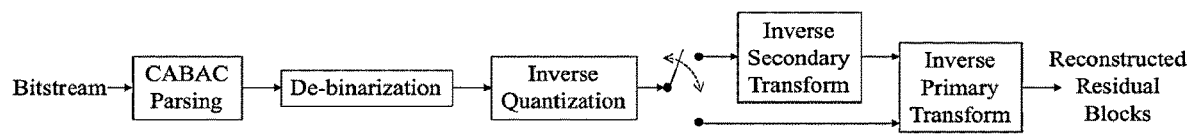
FIG. 14 is a block diagram showing a process of reconstructing a residual signal in a decoder performing a secondary transform according to an embodiment of the present invention.

FIG. 14 is a block diagram showing a process of reconstructing a residual signal in a decoder performing a secondary transform according to an embodiment of the present invention. First, an entropy coder may parse a syntax element related to a residual signal from a bitstream and obtain a quantization coefficient through de-binarization. A transform coefficient may be obtained by performing inverse quantization on the reconstructed quantization coefficient, and the residual signal block may be reconstructed by performing inverse transform on the transform coefficient. Inverse transform may be applied to a block to which transform skip (TS) is not applied, and inverse transform may be performed in the order of secondary inverse transform and primary inverse transform in a decoder. In this case, secondary inverse transform may be omitted, and a condition in which secondary inverse transform may be omitted may be an inter screen predicted block. Alternatively, secondary inverse transform may be omitted depending on a block size condition. The reconstructed residual signal includes a quantization error, and in secondary transform, the quantization error may be reduced compared to when only the primary transform is performed by changing the energy distribution of the residual signal.

Figure 15:
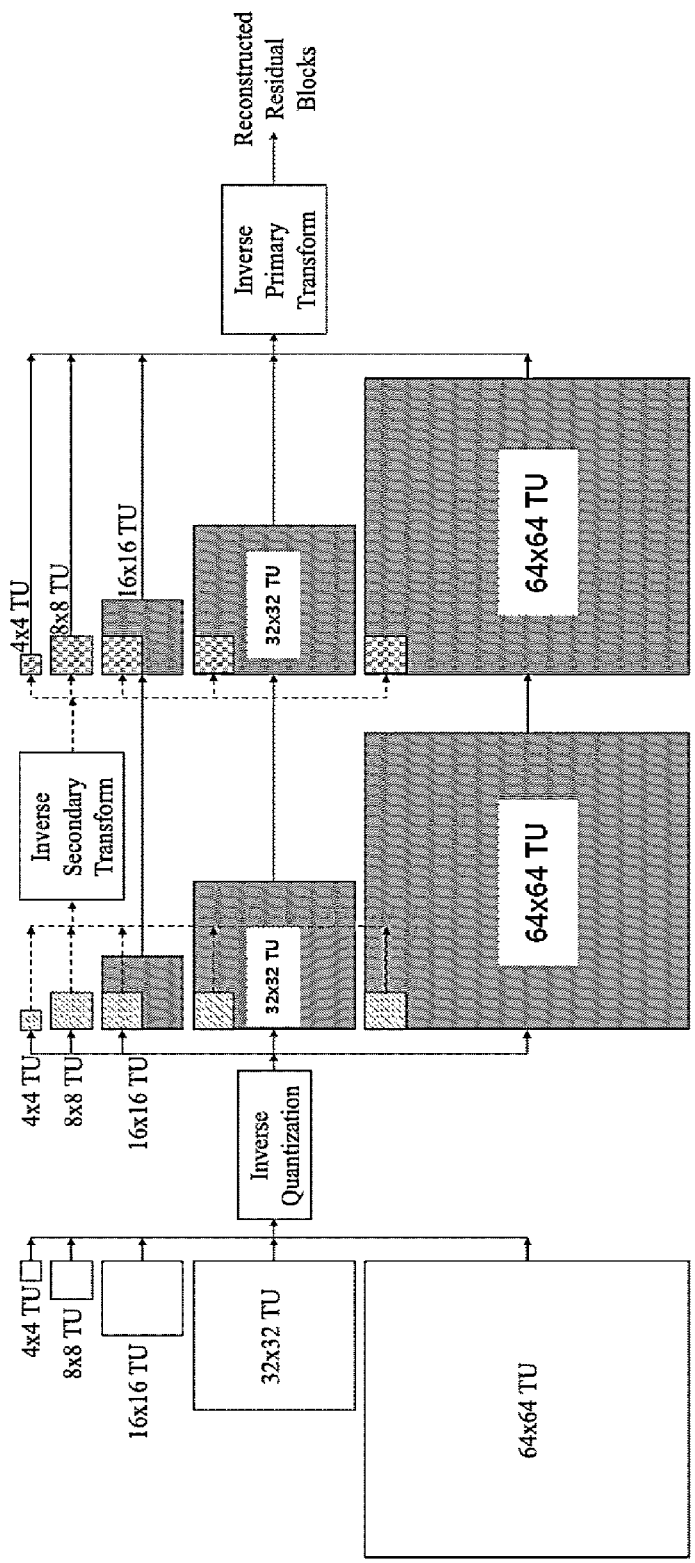
FIG. 15 is a diagram showing the process of reconstructing a residual signal in the decoder performing secondary transform according to an embodiment of the present invention at a block level.

FIG. 15 is a diagram showing the process of reconstructing the residual signal in the decoder performing secondary transform according to an embodiment of the present invention at a block level. Reconstruction of the residual signal may be performed in units of a transform unit (TU) or a sub-block within the TU. FIG. 15 shows a process of reconstructing the residual signal block to which secondary transform is applied, and secondary inverse transform may be first performed on an inverse quantized transform coefficient block. Although it is possible to perform secondary inverse transform on all W×H samples (W: width, number of horizontal samples, H: height, number of vertical samples) in the TU, secondary inverse transform be performed only on the top-left sub-block having a sixe of W'×H', which is the most influential low-frequency region in consideration of complexity. In this case, W' is less than or equal to W, and H' is less than or equal to H. The size W'×H' of the top-left sub-block may be set differently according to the TU size. For example, if min(W, H)=4, both W' and H' may be set to 4, and if min(W, H)>=8, both W' and H' are may be set to 8. min(x, y) represents an operation that returns x if x is less than or equal to y, and returns y if x is greater than y. After performing secondary inverse transform, a transform coefficient of the top-left sub-block having a size of W'×H' in the TU may be obtained, and the residual signal block may be reconstructed by performing primary inverse transform on the transform coefficient block having the entire size of W×H.

Whether or not to perform secondary transform may be indicated by being included in at least one of a high level syntax (HLS) RBSP such as a sequence parameter set (SPS), picture parameter set (PPS), picture header, slice header, and tile group header in the form of a 1-bit flag. Additionally, if secondary transform is performed, the size of the top-left sub-block to be considered in secondary transform may be indicated. For example, in the case of secondary transform considering sub-blocks of 4×4 and 8×8 sizes, whether the sub-block of having a size of 8×8 may be used may be indicated with a 1-bit flag.

When it is indicated, in HLS, that secondary transform is performed, whether or not to apply secondary transform may be indicated by a 1-bit flag at a coding unit (CU) level. In addition, if secondary transform is applied to the current block, an index representing the transform kernel used for secondary transform may be indicated, and secondary transform may be performed using a transform kernel indicated by the corresponding index in a preset transform kernel set according to the prediction mode. The index representing the transform kernel may be binarized using the truncated unary or fixed length binarization methods. At the CU level, the 1-bit flag indicating whether or not to apply secondary transform and the index indicating the transform kernel may be indicated using one syntax element, and in the present invention, this is referred to as st_idx, but the present invention is not limited to this name. For example, the st_idx may be referred to as a secondary transform index or an LFNST index. As an embodiment, the first bit of st_idx may indicate whether or not to apply secondary transform at the CU level, and the remaining bits may represent an index indicating the transform kernel used in secondary transform. This st_idx may be coded using an entropy coder such as context adaptive binary arithmetic coding (CABAC) or context adaptive variable length coding (CAVLC) that adaptively encodes according to a context. If the current CU is split into a plurality of Tus, each of which is less than the CU size, the secondary transform may not be applied, and st_idx, which is a syntax element related to secondary transform, may be set to 0 without signaling. For example, if st_idx is 0, it may represent that secondary transform is not used. On the other hand, if st_idx is greater than 0, it may represent that secondary transform is applied, and a transform kernel used for secondary transform may be selected on the basis of st_idx.

As described above, a leaf node of a multi-type tree may be a coding unit. If the coding unit is not greater than the maximum transform length, the corresponding coding unit may be used as a unit of prediction and/or transform without further splitting. As an embodiment, if the width or height of the current coding unit is greater than the maximum transform length, the current coding unit may be split into a plurality of transform units without explicit signaling regarding splitting. If the size of the coding unit is greater than the maximum transform size, it may be split into a plurality of transform blocks without signaling. In this case, if secondary transform is applied, since performance degradation and complexity may increase, the maximum coding block (or the maximum size of the coding block) to which secondary transform is applied may be limited. The size of the maximum coding block may be the same as the maximum transform size. Alternatively, it may be defined as a size of a preset coding block. As an embodiment, the preset value may be 64, 32, or 16, but the present invention is not limited thereto. In this case, a value to be compared with the preset value (or maximum transform size) may be defined as a length of a long side or the total number of samples.

Meanwhile, DCT-II, DST-VII, and DCT-VIII kernels used in primary transform have separable characteristics, and thus two transforms in the vertical/horizontal direction may be performed on samples in the residual block having a size of N×N, and the size of the transform kernel may be N×N. On the other hand, in the case of secondary transform, the transform kernel has inseparable characteristics, and thus if the number of samples considered in secondary transform is n×n, one transform may be performed, and the size of the transform kernel may be (n^2)×(n^2). For example, if secondary transform is performed on the top-left 4×4 coefficient block, a transform kernel having a size of 16×16 may be applied, and if secondary transform is performed on the top-left 8×8 coefficient block, a transform kernel having a size of 64×64 may be applied. The transform kernel having the size of 64×64 is accompanied by a large amount of multiplication operations, and thus it may be a heavy burden on the encoder and decoder. Accordingly, if the number of samples considered in secondary transform is reduced, the amount of calculation and the memory required for storing the transform kernel may be reduced.

Figure 16:
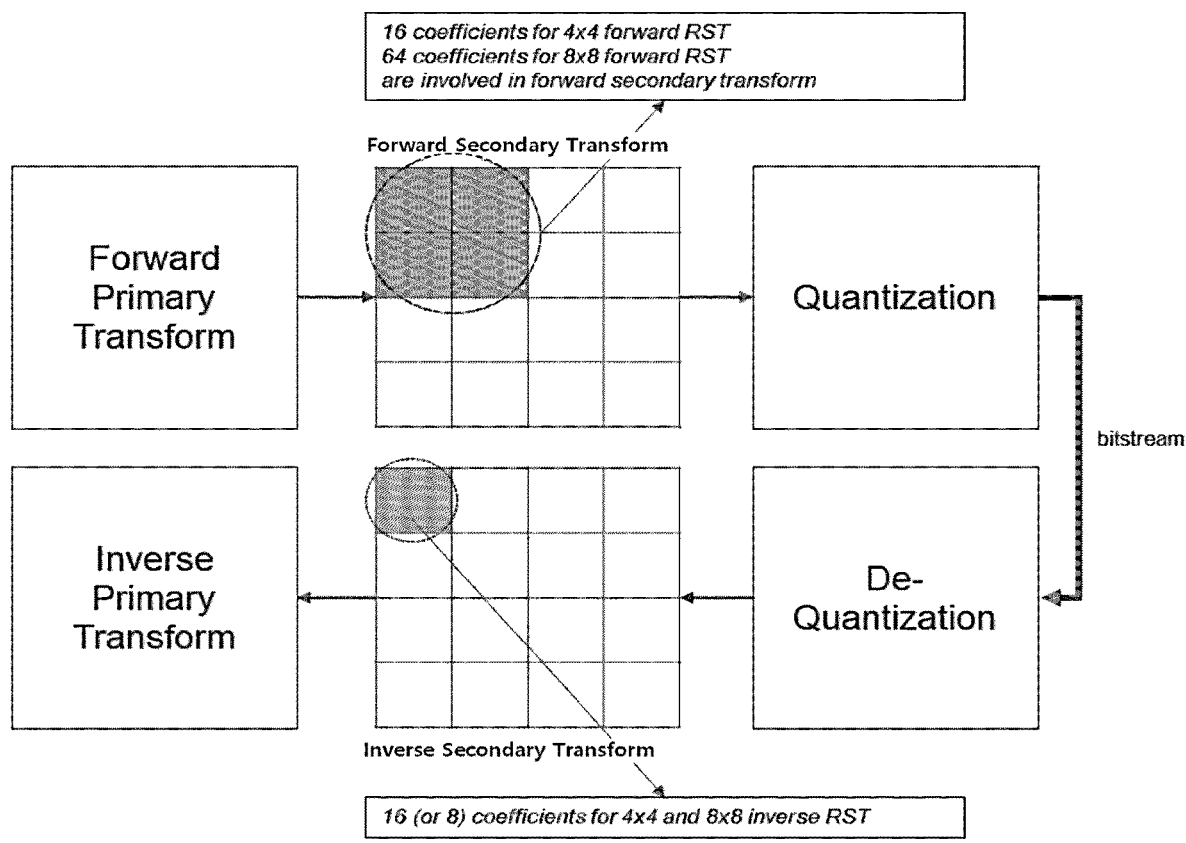
FIG. 16 is a diagram showing a method of applying secondary transform using a reduced number of samples according to an embodiment of the present invention.

FIG. 16 is a diagram showing a method of applying secondary transform using a reduced number of samples according to an embodiment of the present invention. According to an embodiment of the present invention, secondary transform may be expressed by a product of a secondary transform kernel matrix and a primary transformed coefficient vector, and may be interpreted as mapping a primary transformed coefficient to another space. In this case, if the number of coefficients to be secondary transformed is reduced, that is, if the number of basis vectors configuring the secondary transform kernel is reduced, the amount of calculation required for secondary transform and the memory capacity required for storing the transform kernel may be reduced. For example, when secondary transform is performed on the top-left 8×8 coefficient block, if the number of coefficients to be secondary transformed is reduced to 16, a secondary transform kernel having a size of 16(row)×64(column) (or size of 16(row)×48(column)) may be applied. The transformation unit of the encoder may obtain a secondary transformed coefficient vector through an inner product of each row vector configuring the transform kernel matrix and a primary transformed coefficient vector. The inverse transformation unit of the encoder and the decoder may obtain the primary transformed coefficient vector through an inner product of each column vector configuring the transform kernel matrix and the secondary transformed coefficient vector.

Referring to FIG. 16, the encoder may obtain a forward primary transformed coefficient block by performing forward primary transform on a residual signal block first. When the size of the primary transformed coefficient block is M×N, for an intra-predicted block having a value of min(M, N) of 4, 4×4 forward secondary transform may be performed on the left-top 4×4 samples of the forward primary transformed coefficient block. For an intra-predicted block having a value of min(M, N) equal to or greater than 8, 8×8 forward secondary transform may be performed on the top-left 8×8 samples of the forward primary transformed coefficient block. In the case of an 8×8 forward secondary transform, it is accompanied by a large amount of calculation and the memory, and thus only some of the 8×8 samples may be utilized. In one embodiment, in order to improve encoding efficiency, for a rectangular block in which a value of min(M,N) is 4 and M or N is greater than 8 (e.g., a rectangular block having a size of 4×16 or 16×4), 4×4 forward secondary transform may be performed on each of the two top-left 4×4 sub-blocks in the forward primary transformed coefficient block.

The forward secondary transform may be calculated by a product of the secondary transform kernel matrix and the input vector, and thus coefficients in the top-left sub-blocks of the forward primary transformed coefficient block may be configured in a vector form. A method of configuring a vector with the coefficients may depend on an intra prediction mode. For example, if the intra prediction mode is an angle mode whose number is is less than or equal to 34 among the intra prediction modes previously shown in FIG. 6, the coefficients may be configured as a vector by scanning the top-left sub-blocks of the forward primary transformed coefficient block in a horizontal direction. If an element of the i-th row and j-th column of the top-left n×n block of the forward primary transformed coefficient block is expressed as $x\_ij$, the vectorized coefficients may be expressed as $[x\_00, x\_01, \ldots, x\_0n-1, x\_10, x\_11, \ldots, x\_1n-1, \ldots, x\_n-10, x\_n-11, \ldots, x\_n-1n-1]$. On the other hand, if the intra prediction mode is an angle mode whose number is greater than 34, the coefficients may be configured as a vector by scanning the top-left sub-block of the forward primary transformed coefficient in the vertical direction. The vectorized coefficients may be expressed as $[x\_00, x\_10, \ldots, x\_n-10, x\_01, x\_11, \ldots, x\_n-11, \ldots, x\_0n-1, x\_1n-1, \ldots, x\_n-1n-1]$. In order to reduce the amount of calculation, if only some of the 8×8 samples are used in 8×8 forward secondary transform, the coefficient $x\_ij$ whose i>3 and j>3 may not be included in the vector configuration method described above. In this case, in 4×4 forward secondary transform, 16 forward primary transformed coefficients may be considered as inputs of forward secondary transform, and in 8×8 forward secondary transform, 48 forward primary transformed coefficients may be considered as inputs of forward secondary transform.

The secondary forward transformed coefficients may be obtained through a product of the top-left sub-block samples of the vectorized primary forward transform coefficient block and the secondary transform kernel matrix, and the second transform kernel may be determined according to the size of the transform unit, the intra mode, and a syntax element indicating a transform kernel. As described above, if the number of coefficients to be forward secondary transformed is reduced, the amount of calculation and the memory required for storing the transform kernel may be reduced, and thus the number of coefficients to be forward secondary transformed may be determined according to the size of the current transform block. For example, in the case of a 4×4 block, a coefficient vector having a length of 8 may be obtained through a product of a vector having a length of 16 and an 8(row)×16(column) transform kernel matrix. The 8(row)×16(column) transform kernel matrix may be obtained on the basis of the first basis vector to the eighth basis vector that configure a 16(row)×16(column) transform kernel matrix. In the case of a 4×N or M×4 block (N and M are 8 or more), a coefficient vector having a length of 16 may be obtained through a product of a vector having a length of 16 and the 16(row)×16(column) transform kernel matrix. In the case of an 8×8 block, a coefficient vector having a length of 8 may be obtained through a product of a vector having a length of 48 and an 8(row)×48(column) transform kernel matrix. The 8(row)×48(column) transform kernel matrix may be obtained on the basis of the the first basis vector to the eighth basis vector that configure a 16(row)×48(column) transform kernel matrix. In the case of an M×N block excluding 8×8 (M and N are 8 or more), a coefficient vector having a length of 16 may be obtained by multiplying a vector having a length of 48 and a 16(row)×48(column) transform kernel matrix.

According to an embodiment of the present invention, the forward secondary transformed coefficients are in the form of vector, and thus they may be expressed by data in a two-dimensional form. The forward secondary transformed coefficients according to a preset scan order may be configured as the top-left coefficient sub-block. In an embodiment, the preset scan order may be an up-right diagonal scan order. The present invention is not limited thereto, and the up-right diagonal scan order may be determined on the basis of the methods described in FIGS. 17 and 18 to be described later.

In addition, according to an embodiment of the present invention, transform coefficients of an entire transform unit size including the forward secondary transformed coefficients may be transmitted, by being included in a bitstream, after quantization. The bitstream may include the syntax element related to forward secondary transform. Specifically, the bitstream may include information on whether or not forward secondary transform is applied to the current block and information indicating a transform kernel applied to the current block.

The decoder may first parse the quantized transform coefficients from the bitstream and obtain the transform coefficients through de-quantization. The de-quantization may be referred to as scaling. The decoder may determine, based on the syntax element related to forward secondary transform, whether or not secondary inverse transform is performed on the current block. If secondary inverse transform is applied to the current transform unit, 8 or 16 transform coefficients may be inputs of secondary inverse transform depending on the size of the transform unit, which may correspond to the number of coefficients output from the secondary transform of the encoder. For example, if the size of the transform unit is 4×4 or 8×8, 8 transform coefficients may be inputs of secondary inverse transform, otherwise, 16 transform coefficients may be inputs of secondary inverse transform. When the size of the transform unit is M×N, 4×4 secondary inverse transform may be performed on 16 or 8 coefficients of the top-left 4×4 sub-block of the transform coefficient block for an intra-predicted block having a value of min(M, N) of 4. For an intra-predicted block having min(M, N) equal to or greater than 8, 8×8 secondary inverse transform may be performed on 16 or 8 coefficients of the top-left 4×4 sub-block of the transform coefficient block. In one embodiment, in order to improve encoding efficiency, if min(M,N) is 4 and M or N is greater than 8 (for example, a rectangular block having a size of 4×16 or 16×4), 4×4 secondary inverse transform may be performed on each of the two top-left 4×4 sub-blocks in the transform coefficient block.

According to an embodiment of the present invention, secondary inverse transform may be computed by a product of a secondary inverse transform kernel matrix and an input vector, and thus the decoder may first configure the de-quantized transform coefficient blocks that are input in a vector form according to a preset scan order. In one embodiment, the preset scan order may be an up-right diagonal scan order, and the present invention is not limited thereto, and the up-right diagonal scan order may be determined on the basis of the methods described in FIGS. 17 and 18 to be described later.

In addition, according to an embodiment of the present invention, the decoder may obtain a forward primary transformed coefficient through a product of a vectorized transform coefficient and a secondary inverse transform kernel matrix. In this case, the secondary inverse transform kernel may be determined according to the size of the transform unit, the intra mode, and a syntax element indicating the transform kernel. The secondary inverse transform kernel matrix may be a transpose matrix of the secondary transform kernel matrix, and the elements of the kernel matrix may be integers expressed with 10-bit or 8-bit accuracy in consideration of implementation complexity. A length of the vector that is an output of the secondary inverse transform may be determined on the basis of the size of the current transform block. For example, in the case of a 4×4 block, a coefficient vector having a length of 16 may be obtained through a product of a vector having a length of 8 and an 8(row)×16 (column) transform kernel matrix. The 8(row)×16(column) transform kernel matrix may be obtained on the basis of the first basis vector to the eighth basis vector that configure a 16(row)×16(column) transform kernel matrix. In the case of a 4×N or M×N block (N and M are 8 or more), a coefficient vector having a length of 16 may be obtained through a product of a vector having a length of 16 and the 16(row)×16(column) transform kernel matrix. In the case of an 8×8 block, a coefficient vector having a length of 48 may be obtained through a product of a vector having a length of 8 and an 8(row)×48(column) transform kernel matrix. The 8(row)×48(column) transform kernel matrix may be obtained on the basis of the the first basis vector to the eighth basis vector that configure a 16(row)×48(column) transform kernel matrix. In the case of an M×N block excluding 8×8 (M and N are 8 or more), a coefficient vector having a length of 48 may be obtained through a product of a vector having a length of 16 and the 16(row)×48(column) transform kernel matrix.

In an embodiment, the primary transform coefficients obtained through the secondary inverse transform is in the form of a vector, the decoder may express the primary transform coefficient again by data in a two-dimensional form, which may depend on the intra mode. The mapping relationship based on the intra mode applied by the encoder may be applied in the same way. As described above, if the intra prediction mode is an angle mode whose number is less than or equal to 34, a transform coefficient array in a two-dimensional form may be obtained by scanning the secondary inverse transformed coefficient vector in the horizontal direction, and if the intra prediction mode an angle mode whose number is greater than 34, the transform coefficient array in a two-dimensional form may be obtained by scanning the secondary inverse transformed coefficient vector in the vertical direction. A residual signal may be obtained by performing a primary inverse transform on a transform coefficient block having the entire transform unit size including transform coefficients obtained by performing secondary inverse transform.

Although not shown in FIG. 16, a scaling process using a bit shift operation may be included in order to correct a scale that increases due to a transform kernel after transform or inverse transform.

FIG. 17 is a diagram illustrating a method of determining an up-right diagonal scan order according to an embodiment of the present invention. According to an embodiment of the present invention, a process of initializing a scan order may be performed during encoding or decoding. Initialization of an array including scan order information may be performed according to the block size. Specifically, a process of initializing an up-right diagonal scan order array shown in FIG. 17 in which 1<<log 2BlockWidth and 1<<log 2BlockHeight are inputs for a combination of log 2BlockWidth and log 2BlockHeight may be invoked (or performed). Output of the process of initializing the up-right diagonal scan order array may be allocated to DiagScanOrder[log 2BlockWidth][log 2BlockHeight]. Here, log 2BlockWidth and log 2Block-Height represent variables representing values obtained by taking the logarithm of base 2 to the width and height of the block, respectively, and may be values in the range of [0, 4].

The encoder/decoder may output an array diagScan[sPos][sComp] for blkWidth, which is a width of a block received as an input, and blkHeight, which is a height of the block received as an input, through the process of initializing the up-right diagonal scan order array illustrated in FIG. 17. An index sPos of the array may represent a scan position and may be a value in the range of [0, blkWidth*blkHeight−1]. If sComp, which is an index of an array, is 0, it may represent a horizontal component (x), and if sComp is 1, it may represent a vertical component (y). The algorithm shown in FIG. 17 may be interpreted that the x-coordinate value and y-coordinate value on the two-dimensional coordinates at the scan position sPos are allocated to diagScan[sPos][0] and diagScan[sPos][1], respectively, according to the up-right diagonal scan order. That is, the value stored in DiagScanOrder[log 2BlockHeight][sPos][sComp] array (or array) may mean a coordinate value corresponding to sComp at the sPos scan position in the up-right diagonal scan order of a block whose width and height are 1<<log 2BlockWidth and 1<<log 2BlockHeight, respectively.

FIG. 18 is a diagram illustrating an up-right diagonal scan order according to an embodiment of the present invention according to a block size. Referring to FIG. 18, if both log 2BlockWidth and log 2BlockHeight are 2, it may mean a block having a size of 4×4. Referring to FIG. 18, if both log 2BlockWidth and log 2BlockHeight are 3, it may mean a block having a size of 8×8. In FIG. 18, the numbers displayed in the gray shaded region represent the scan position sPos. The x-coordinate value and y-coordinate value at the sPos position may be allocated to DiagScanOrder[log 2BlockWidth][log 2BlockHeight][sPos][0] and DiagScanOrder[log 2BlockWidth][log 2BlockHeight][sPos][1], respectively.

The encoder/decoder may code transform coefficient information based on the scan order described above. In the present invention, an embodiment based on a case in which the up-right scanning method is used is mainly described, but the present invention is not limited thereto and may also be applied to other known scanning methods.

In the following, a decoding process related to forward secondary transform will be described in detail. For convenience of description, the process related to secondary transform is mainly described with a decoder, but the embodiments described below may be applied to the encoder in substantially the same manner.

According to an embodiment of the present invention, the following variables may be received as inputs in a transform process of secondary transform.

(xTbY, yTbY): indicates a position (or coordinates) of a top-left luma sample of the current luma transform block, and may be a position relative to the top-left luma sample of the current picture.

nTbW, nTbH: represents a width and height of the current transform block, respectively.

cIdx: represents a variable that means the color component of the current block. When cIdx is 0, it may mean luma Y, when cIdx is 1, it may mean chroma Cb, and when cIdx is 2, it may mean chroma Cr.

d[x][y]: is an array of (nTbW)×(nTbH) having a size of (nTbW)×(nTbH)) and represents a transform coefficient array. In this case, x may be in the range of [0, nTbW−1], and y may be in the range of [0, nTbH−1].

The transform process according to this embodiment may output r[x][y], which is an array of residual samples having a size of (nTbW)×(nTbH), where x may be in the range of [0, nTbW−1] and y may be in the range of [0, nTbH−1].

In one embodiment, whether or not secondary transform is applied to the current block may be determined depending on a value of a syntax element st_idx[xTbY][yTbY] indicating a secondary transform index (or LFNST index). For example, if the value of st_idx[xTbY][yTbY] is greater than 0, a decoding process related to secondary transform may be performed, and if the value of st_idx[xTbY][yTbY] is 0, secondary transform is not performed (or applied), and only the primary transform may be performed. As an additional embodiment, even if the value of st_idx[xTbY][yTbY] is greater than 0, the decoding process related to secondary transform may not be performed depending on the currently processed color component. When secondary transform is applied, in the decoder, a residual sample may be obtained after secondary inverse transform and primary inverse transform are performed, and thus a delay time may increase compared to when only the primary inverse transform is applied. In particular, the delay time generated by performing secondary transform is the largest in a single tree coding structure in which both luma and chroma components may exist (a structure in which luma and chroma components are encoded with the same coding tree), and thus even if st_idx[xTbY][yTbY] is greater than 0, secondary inverse transform may not be applied in a chroma transform block in the single tree coding structure.

In an embodiment of the present invention, if the value of st_idx[xTbY][yTbY] is greater than 0, variables related to the transform process may be set as follows.

If both nTbW and nTbH are 8 or more, log 2StSize may be set to 3 and nStOutSize may be set to 48. Otherwise, log 2StSize may be set to 2 and nStOutSize may be set to 16. The log 2StSize is a variable representing a value obtained by taking the logarithm of base 2 to the size to which secondary transform is applied. If log 2StSize is 2, it may represent that 4×4 secondary transform is applied, and if log 2StSize is 3, it may represent that 8×8 secondary transform is applied. The nStOutSize is a variable representing the number of samples output by secondary transform.

nStSize may be set to 1<<log 2StSize. Here, nStSize is a variable representing the size to which secondary transform is applied.

log 2SbSize is a variable representing the size of a sub-block and may be set to 2.

If nTbH is 4 and nTbW is greater than 8, the variable numStX may be set to 2, otherwise it may be set to 1. Here, numStX is a variable representing the number of sub-blocks in the horizontal direction that is an input of secondary transform.

If nTbW is 4 and nTbH is greater than 8, the variable numStY may be set to 2, otherwise it may be set to 1. Here, numStY is a variable representing the number of sub-blocks in the vertical direction to be input for secondary transform.

If both nTbW and nTbH are 4, or if both nTbW and nTbH are 8, that is, 4×4 or 8×8 block, nonZeroSize may be set to 8, otherwise, it may be set to 16. Here, nonZeroSize is a variable representing the size of a coefficient vector that is an input of secondary transform.

Based on the set variables, the following processes may be applied from 0 to numStX−1 of xSbIdx, which is a sub-block index in the horizontal direction, and from 0 to numStY−1 of ySbIdx, which is a sub-block index in the vertical direction. However, the present invention is not limited thereto, and the following process may be applied in the same way even if secondary transform is applied only to one top-left sub-block (or a top-left predetermined specific region).

Array u[x] is a coefficient vector that is an input of secondary transform, and x may be in the range of [0, nonZeroSize−1]. d[xC][yC], which is a scaled transform coefficient (or inverse quantized transform coefficient) that is an input of the transform process according to the present embodiment, is a two-dimensional array (or array), and the decoder may allocate nonZeroSize samples among all samples of d[xC][yC] to u[x] according to a scan order. Here, nonZeroSize is a variable representing the length of the input vector or the maximum number of valid coefficients that the input vector may contain. In setting the xC and yC indices, x which is the index of the array u[x] may mean a scan position in the scan order. The decoder may obtain the x-coordinate value in the sub-block for the scan position x through the value of DiagScanOrder[log 2SbSize][log 2SbSize][x][0] and determine xC on the basis of the x-coordinate value. In an embodiment, the decoder may determine the x-coordinate value in the sub-block for the scan position x as xC through the value of DiagScanOrder

[log 2SbSize][log 2SbSize][x][0]. In another embodiment, the decoder may determine xC by adding (xSbIdx<<log 2StSize) to the left-top x-coordinate value of the sub-block. Similarly, a y-coordinate value in the sub-block for the scan position x may be obtained through the value of DiagScanOrder[log 2SbSize][log 2SbSize][x][1] and yC may be determined on the basis of the y-coordinate value.

In one embodiment, the decoder may determine the y-coordinate value in the sub-block for the scan position x as yC through the value of DiagScanOrder[log 2SbSize][log 2SbSize][x][1]. In another embodiment, yC may be determined by adding (ySbIdx<<log 2StSize) to the top-left y-coordinate value of the sub-block. The decoder may allocate d[xC][yC] to u[x] from when x is 0 to when x is nonZeroSize−1. In this case, the scan order may be an up-right diagonal scan order, and the method previously described with reference to FIGS. 17 and 18 may be applied. In one embodiment, the array u[x] may be determined (or derived) on the basis of Equation 1 below.

$$xC=(xSbIdx<<\log 2StSize)+DiagScanOrder[\log 2SbSize][\log 2SbSize][x][0]$$

$$yC=(ySbIdx<<\log 2StSize)+DiagScanOrder[\log 2SbSize][\log 2SbSize][x][1]$$

$$u[x]=d[xC][yC] \quad \text{[Equation 1]}$$

In one embodiment, the block size, which is one of the elements for determining the scan order, may always be defined as 4×4 (i.e., log 2SbSize=2). In other words, log 2SbSize of Equation 1 may be defined (or set) as 2.

In addition, as described above, secondary transform may be applied only to one top-left sub-block (or a top-left predetermined specific region) (i.e., a region where xSbIdx=0 and ySbIdx=0), and in this case, the array u[x] may be determined (or derived) on the basis of Equation 2 below.

$$xC=DiagScanOrder[\log 2SbSize][\log 2SbSize][x][0]$$

$$yC=DiagScanOrder[\log 2SbSize][\log 2SbSize][x][1]$$

$$u[x]=d[xC][yC] \quad \text{[Equation 2]}$$

In Equation 2, the block size, which is one of the elements for determining the scan order, may always be defined as 4×4 (i.e., log 2SbSize=2). In other words, log 2SbSize of Equation 2 may be defined (or set) as 2.

According to another embodiment of the present invention, the decoder may set a factor of DiagScanOrder to [log 2StSize][log 2StSize] in order to determine xC and yC. In this case, if the size of the transform block is greater than 8×8, as shown in FIG. 18, d[xC][yC] in the first sub-block (x=0, 1, ..., 9, 11, 12, 13), the second sub-block (x=10, 15), and the third sub-block (x=14) may be allocated to u[x]. In this case, a problem occurs in that a transform coefficient not positioned in the top-left sub-block is allocated as an input of secondary transform depending on the size of the transform block. On the other hand, as in the embodiment of the present invention described above, if the factor of DiagScanOrder is set to [log 2SbSize][log 2SbSize], d[xC][yC] in the first sub-block (x=0, 1, 2, ..., 15) (i.e., top-left sub-block) may be allocated to u[x], and the problem described above may be solved.

The set array u[x] (the range of x is [0, nonZeroSize−1]) may be transformed into an array v[x] (the range of x is [0, nStOutSize−1]) by a secondary transform process of FIG. 19 to be described later. In this case, in the secondary transform process, a transform input length nonZeroSize, a transform output length nStOutSize, an inverse quantized transform coefficient u[x] (whose length is nonZeroSize−1, and the range of x is [0, nonZeroSize−1]), an intra screen prediction mode of the current block stPredModeIntra, and st_idx [xTbY][yTbY] may be received as inputs, and the transformed coefficient v[x] (whose length is nStOutSize, and the range of x is [0, nStOutSize−1]) may be output.

The array v[x], which is the output of the secondary transform process, may be allocated to d[(xSbIdx<<log 2StSize)+x][(ySbIdx<<log 2StSize)+y] according to the intra prediction mode as follows, and the ranges of x and y may be [0, nStSize−1].

Based on Equation 3 below, if the intra mode is less than or equal to 34, when y<4 or y>=4 && x<4, v may be sequentially allocated in the horizontal direction (by scanning in the horizontal direction). When x>=4 && y>=4, v may not be allocated to d.

$$d[(xSbIdx<<\log 2StSize)+x][(ySbIdx<<\log 2StSize)+y]=(y<4)?v[x+(y<<\log 2StSize)]:((x<4)?v[32+x+((y-4)<<2)]:d[(xSbIdx<<\log 2StSize)+x][(ySbIdx<<\log 2StSize)+y]) \quad \text{[Equation 3]}$$

Based on Equation 4 below, if the intra mode is greater than 34, when y<4 or y>=4 && x<4, v may be sequentially allocated in the vertical direction (by scanning in the vertical direction). When x>=4 && y>=4, v may not be allocated to d.

$$d[(xSbIdx<<\log 2StSize)+x][(ySbIdx<<\log 2StSize)+y]=(x<4)?v[y+(x<<\log 2StSize)]:((y<4)?v[32+y+((x-4)<<2)]:d[(xSbIdx<<\log 2StSize)+x][(ySbIdx<<\log 2StSize)+y]) \quad \text{[Equation 4]}$$

FIG. 19 is a diagram illustrating an example of a secondary transform process according to an embodiment of the present invention. Referring to FIG. 19, in the secondary transform process according to an embodiment of the present invention, the following variables may be received as inputs.

nTrS: represents a variable indicating a transform output length.

nonZeroSize: represents a variable indicating the transform input length.

x[j]: Array x[j] represents a transform input, and j may be in the range of [0, nonZeroSize−1].

stPredModeIntra: represents a variable indicating the intra prediction mode of the current block, and may be used to determine the index of the transform kernel set.

stIdx: a specific transform kernel set may be determined based on the stPredModeIntra, and select a specific transform kernel in the transform kernel set based on stIdx. That is, stIdx represents an index indicating a specific transform kernel used for second transform of the current block in the specific transform kernel set determined on the basis of stPredModeIntra.

In the second transform process according to the present embodiment, y[i], which is an array of transform output samples may be output, and the range of i may be [0, nTrS−1]. In the second transform process, a transform matrix derivation process of FIG. 20, which will be described later, may be performed. In this case, in the transform matrix derivation process, nTrS indicating a transform output length, an intra prediction mode stPredModeIntra for a transform kernel set, and an index stIdx indicating a transform kernel in the transform kernel set may be received as inputs. In addition, in the transform matrix derivation process, secTransMatrix, which is a transform kernel matrix, may be output. In this case, secTransMatrix that is output may have a size of (nTrS)×(nonZeroSize), and the element of secTransMatrix may be an integer. y[i], which is an i-th element of the transform output, may be computed using an inner product of a i-th column of secTransMatrix and the transform input array x. In this case, as an embodiment, the computation result may be clipped to a value between a minimum coefficient value CoeffMin and a maximum coefficient value CoeffMax through a clipping operation. In the Clip3(x, y, z) operation of FIG. 19, when z is less than x, the result of the operation may be set to x, and when z is greater than y, the result of the operation may be set to y. Otherwise, the result of the operation may be set to z. In one embodiment, the transform coefficient may be expressed with preset precision, and the preset precision may be 16 bits. In this case, CoeffMin and CoeffMax may be set to $(2^{16})$ and $(2^{16})-1$, respectively.

FIG. 20 is a diagram illustrating a secondary transform matrix derivation process according to an embodiment of the present invention. According to an embodiment of the present invention, in the secondary transform matrix derivation process, the following variables may be received as inputs.

nTrS: represents a variable indicating a transform output length.

stPredModeIntra represents a variable indicating the intra prediction mode of the current block, and may be used to determine an index of the transform kernel set.

stIdx: represents an index indicating the transform kernel in a selected transform kernel set.

The determination of the secondary transform kernel set according to an embodiment of the present invention may depend on an intra mode (or intra prediction mode). For example, as in the table shown in FIG. 20, the encoder/decoder may group the intra modes into four mode groups. The transform kernel set for each group may be indicated by (or allocated as) stTrSetIdx. In addition, whether it is a 4×4 secondary transform kernel or an 8×8 secondary transform kernel may be indicated by the nTrS variable. The nTrS is a variable indicating the transform output length. An stIdx-th transform kernel matrix, among the transform kernels having the size indicated by the nTrS variable in the transform kernel set indicated by stTrSetIdx, may be output as secTransMatrix. In this case, nTrS may be 16 or 48. For example, if the intra prediction mode of the current block is the INTRA_DC mode, stPredModeIntra is 1, and the 0-th transform kernel set may be selected. In this case, if nTrS is 16 and stIdx is 1, a first transform kernel matrix among 4×4 secondary transform kernels may be output. As another example, if the intra modes are INTRA_LT_CCLM (81), INTRA_L_CCLM (82), and INTRA_T_CCLM (83), stTrSetIdx may be determined to be 0 instead of 1, which may indicate that the 0-th transform kernel set is used.

As another embodiment of determining the transform kernel set, the intra modes may be grouped according to whether the intra mode is an odd number or even number. For the directional intra mode, if stPredModeIntra<=80 and stPredModeIntra is an odd number, stTrSetIdx may be allocated as 1. In addition, if stPredModeIntra<=80 and stPredModeIntra is an even number, stTrSetIdx may be allocated as 2. If stPredModeIntra is one of 0, 1, 81, 82, and 83, stTrSetIdx may be allocated as 0.

In addition, as another embodiment of determining the transform kernel set to be allocated, the encoder/decoder may differently allocate stTrSetIdx for CCLM modes. In the case of INTRA_L_CCLM (82), a linear relationship between the reconstructed chroma samples on the left adjacent to the current block and the corresponding luma samples is derived and used for prediction, and thus the pattern of the residual signal may be similar to the INTRA_ANGULAR_18 (18) mode, in which the reconstructed samples on the left adjacent to the current block are used as reference samples. In addition, in the case of INTRA_T_CCLM (83), a linear relationship between the reconstructed chroma samples on the upper side adjacent to the current block and the corresponding luma samples is derived and used for prediction, and thus the pattern of the residual signal may be similar to the INTRA_ANGULAR_50 (50) mode in which the reconstructed samples on the upper side adjacent to the current block are used as reference samples. Accordingly, in the table shown in FIG. 20, the encoder/decoder may set stTrSetIdx to 0 if stPredModeIntra is 81 (INTRA_LT_CCLM), and stTrSetIdx to 2 if stPredModeIntra is 82 (INTRA_L_CCLM) or 83 (INTRA_T_CCLM).

In addition, as another embodiment of determining the transform kernel set, all intra modes may use the same transform kernel set. That is, the transform kernel used is not dependent on the intra mode, and may be determined by nTrS and stIdx, and the stIdx-th transform kernel may be selected from among the transform kernels having a size indicated by nTrS.

In addition, as another embodiment of determining the transform kernel set, the transform kernel set may be determined based on the transform kernel applied to first transform, without being based on the intra mode. For example, if DST-VII is applied to both the horizontal and vertical directions, stTrSetIdx may be set to 1. If DST-VII is applied only to one of the horizontal and vertical directions, stTrSetIdx may be set to 2. Otherwise, stTrSetIdx may be set to 0.

Figure 21:
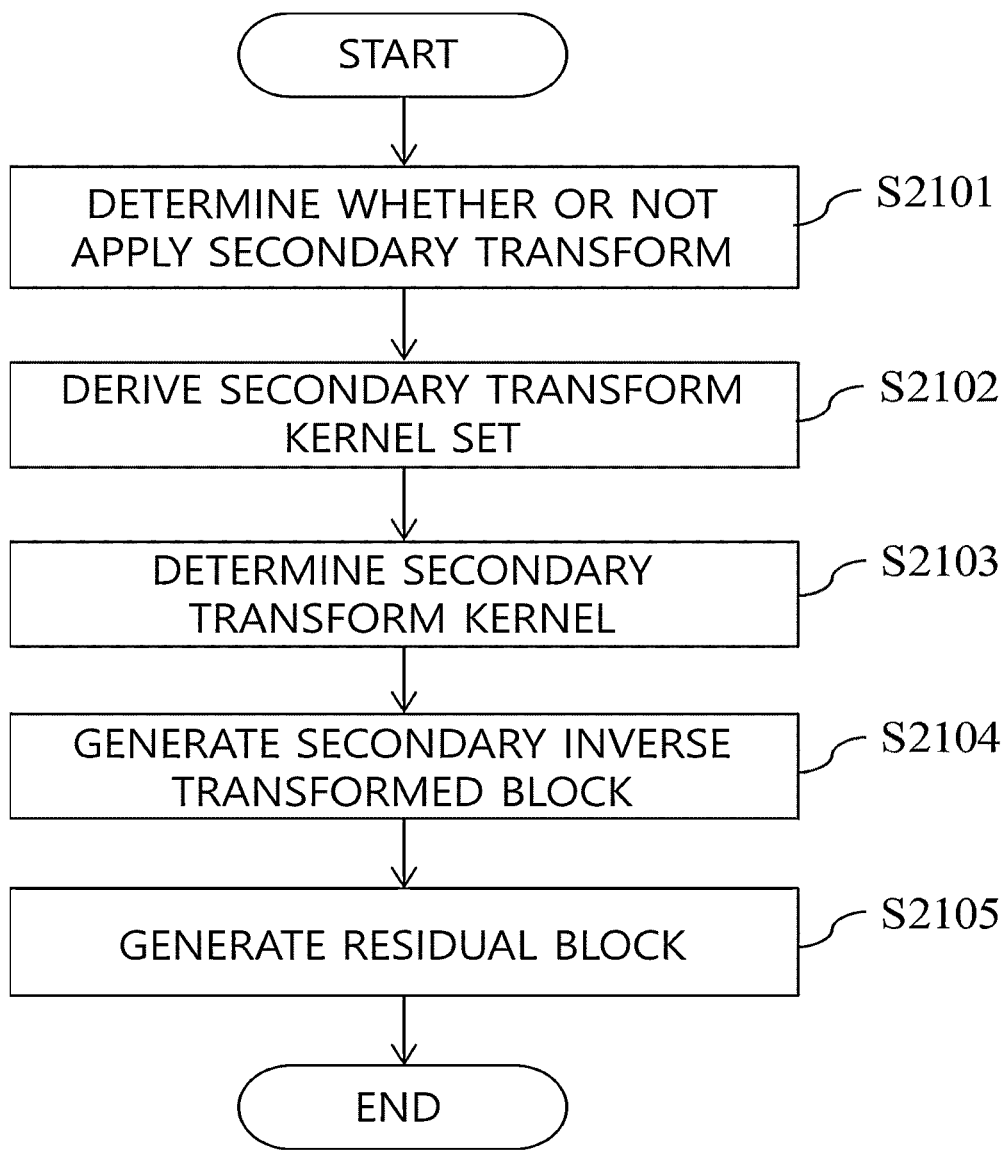
FIG. 21 is a flowchart representing a video signal processing method according to an embodiment of the present invention

FIG. 21 is a flowchart representing a video signal processing method according to an embodiment of the present invention. Referring to FIG. 21, a decoder is mainly described for convenience of description, but the present invention is not limited thereto, and the video signal processing method according to the present embodiment may also be applied to an encoder in substantially the same manner.

The decoder determines whether or not a secondary transform (or a secondary inverse transform) is applied to the current block (S2101). As described above, the secondary transform may be referred to as the low frequency non-separable transform (LFNST). The secondary transform may be applied after a primary transform is applied with the encoder side as a reference. That is, the secondary transform may represent transform applied before the primary transform with the decoder side as a reference.

When the secondary transform is applied to the current block, the decoder derives a secondary transform kernel set applied to the current block from among predefined secondary transform kernel sets on the basis of the intra prediction mode of the current block (S2102).

The decoder determines a secondary transform kernel applied to the current block in the determined secondary transform kernel set (S2103).

The decoder generates a secondary inverse transformed block by performing a secondary inverse transform on a top-left specific region of the current block using the secondary transform kernel (S2104).

The decoder generates a residual block of the current block by performing a primary inverse transform on the inverse secondary transformed block (S2105).

As described above, the secondary inverse transform may be performed by receiving an inverse quantized transform coefficient on the basis of a fixed scan order as input regardless of the size of the secondary transform kernel as input.

In addition, as described above, the step of generating the secondary inverse transformed block may include a step of allocating the inverse quantized transform coefficient to an input coefficient array of the secondary inverse transform on the basis of an up-right diagonal scan order.

In addition, as described above, the up-right diagonal scan order may be predefined as a scan order for a block having a size of 4×4.

In addition, as described above, the step of determining whether or not the secondary transform is applied to the current block may include a step of obtaining, if a predefined condition is satisfied, a syntax element indicating whether or not secondary transform is applied to the current block. As described above, the syntax element may be referred to as a secondary transform index or an LFNST index. As an embodiment, the predefined condition may include whether or not the width and height of the current block are less than or equal to the maximum transform size.

In addition, as described above, the step of determining whether or not the secondary transform is applied to the current block may comprise a step of inferring, if the predefined condition is not satisfied, the syntax element as 0.

In addition, as described above, if the value of the syntax element is 0, the secondary transform may be determined as being not applied to the current block, and if the value of the syntax element is not 0, a secondary transform kernel applied to the current block may be determined in the determined secondary transform kernel set according to the value of the syntax element.

In addition, as described above, if the width or height of the current block is greater than the maximum transform size, the current block may be split into a plurality of transform units.

The above-described embodiments of the present invention may be implemented through various means. For example, embodiments of the present invention may be implemented by hardware, firmware, software, or a combination thereof.

In the case of implementation by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising a processor, wherein the processor is configured to:
obtain a secondary transform kernel for a current block based on an intra prediction mode of the current block to which a secondary transform is applied,
obtain a secondary inverse transformed block by performing a secondary inverse transform on a top-left specific region of the current block using the secondary transform kernel,
wherein the secondary inverse transform is an inverse transform of the secondary transform, and the secondary transform is a low frequency non-separable transform,
obtain a residual block of the current block by performing a primary inverse transform on the secondary inverse transformed block,
wherein one or more coefficients of the top-left specific region of the current block are derived in a preset scan order,
wherein the preset scan order is a 4×4 up-right diagonal scan order regardless of a size of the current block.

2. The decoding device of claim 1,
wherein the secondary transform kernel is obtained from a predetermined secondary transform kernel set based on the intra prediction mode of the current block.

3. The decoding device of claim 2,
wherein the processor is configured to:
determine whether the current block is a block to which the secondary transform is applied.

4. The decoding device of claim 3,
wherein whether the current block is the block to which the secondary transform is applied is determined by a parsing result of a syntax element,
wherein the syntax element is parsed when a width and a height of a coding block related to the current block are less than or equal to a maximum transform size.

5. The decoding device of claim 4,
wherein the secondary transform kernel is determined based on a value of the syntax element.

6. The decoding device of claim 4,
wherein when the width or the height of the coding block is greater than the maximum transform size, the coding block is split into a plurality of transform blocks.

7. The decoding device of claim 4,
wherein when at least one of the width and the height of the coding block is greater than the maximum transform size, the syntax element is not parsed.

8. The decoding device of claim 7,
wherein when the syntax element is not parsed, the current block is a block to which the secondary transform is not applied.

9. A video signal encoding device comprising a processor, wherein the processor is configured to:
obtain a bitstream to be decoded by a decoder using a decoding method,
wherein the decoding method comprising:
obtaining a secondary transform kernel for a current block based on an intra prediction mode of the current block to which a secondary transform is applied,
obtaining a secondary inverse transformed block by performing a secondary inverse transform on a top-left specific region of the current block using the secondary transform kernel,
wherein the secondary inverse transform is an inverse transform of the secondary transform, and the secondary transform is a low frequency non-separable transform,
obtaining a residual block of the current block by performing a primary inverse transform on the secondary inverse transformed block,
wherein one or more coefficients of the top-left specific region of the current block are derived in a preset scan order,
wherein the preset scan order is a 4×4 up-right diagonal scan order regardless of a size of the current block.

10. The encoding device of claim 9,
wherein the secondary transform kernel is obtained from a predetermined secondary transform kernel set based on the intra prediction mode of the current block.

11. The encoding device of claim 10,
wherein the decoding method further comprising:
determining whether the current block is a block to which the secondary transform is applied.

12. The encoding device of claim 11,
wherein whether the current block is the block to which the secondary transform is applied is determined by a parsing result of a syntax element,
wherein the syntax element is parsed when a width and a height of a coding block related to the current block are less than or equal to a maximum transform size.

13. The encoding device of claim 12,
wherein the secondary transform kernel is determined based on a value of the syntax element.

14. The encoding device of claim 12,
wherein when the width or the height of the coding block is greater than the maximum transform size, the coding block is split into a plurality of transform blocks.

15. A non-transitory computer-readable medium storing a bitstream, the bitstream being decoded by a decoding method,
wherein the decoding method, comprising:
obtaining a secondary transform kernel for a current block based on an intra prediction mode of the current block to which a secondary transform is applied,
obtaining a secondary inverse transformed block by performing a secondary inverse transform on a top-left specific region of the current block using the secondary transform kernel,
wherein the secondary inverse transform is an inverse transform of the secondary transform, and the secondary transform is a low frequency non-separable transform,
obtaining a residual block of the current block by performing a primary inverse transform on the secondary inverse transformed block,
wherein one or more coefficients of the top-left specific region of the current block are derived in a preset scan order,
wherein the preset scan order is a 4×4 up-right diagonal scan order regardless of a size of the current block.

16. The non-transitory computer-readable medium of claim 15,
wherein the secondary transform kernel is obtained from a predetermined secondary transform kernel set based on the intra prediction mode of the current block.

17. The non-transitory computer-readable medium of claim 16,
wherein the decoding method further comprising:
determining whether the current block is a block to which the secondary transform is applied.

18. The non-transitory computer-readable medium of claim 17,
wherein whether the current block is the block to which the secondary transform is applied is determined by a parsing result of a syntax element,
wherein the syntax element is parsed when a width and a height of a coding block related to the current block are less than or equal to a maximum transform size.

19. The non-transitory computer-readable medium of claim 18,
wherein the secondary transform kernel is determined based on a value of the syntax element.

20. The non-transitory computer-readable medium of claim 18,
wherein when the width or the height of the coding block is greater than the maximum transform size, the coding block is split into a plurality of transform blocks.

* * * * *